US012670820B2

(12) United States Patent　　　　　　(10) Patent No.:　US 12,670,820 B2
Kang et al.　　　　　　　　　　　　　　(45) Date of Patent:　Jun. 30, 2026

(54) DISPLAY DEVICE AND MOBILE ELECTRONIC DEVICE FOR DISPLAYING VIRTUAL REALITY OR AUGMENTED REALITY

(71) Applicant: Samsung Display Co., LTD., Yongin-si (KR)

(72) Inventors: Yong Kyu Kang, Yongin-si (KR); Ju Hwa Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/029,994

(22) Filed: Jan. 17, 2025

(65) Prior Publication Data

US 2025/0316193 A1　　Oct. 9, 2025

(30) Foreign Application Priority Data

Apr. 9, 2024　(KR) ........................ 10-2024-0047994

(51) Int. Cl.
　　*G09G 3/00*　　　(2006.01)
　　*G02B 27/01*　　(2006.01)
　　*G06F 3/01*　　　(2006.01)

(52) U.S. Cl.
　　CPC ......... *G09G 3/001* (2013.01); *G02B 27/0172* (2013.01); *G02B 27/0179* (2013.01); *G06F 3/013* (2013.01); *G02B 2027/0178* (2013.01); *G02B 2027/0187* (2013.01); *G09G 2354/00* (2013.01)

(58) Field of Classification Search
CPC .............. G02B 27/017; G02B 27/0172; G02B 27/0179; G02B 2027/0178; G02B 2027/0187; G06F 3/013; G09G 3/001; G09G 2354/00
See application file for complete search history.

(56) References Cited

U.S. PATENT DOCUMENTS

| | | | |
|---|---|---|---|
| 10,466,484 B1 | 11/2019 | Yoon et al. | |
| 11,662,812 B2 | 5/2023 | Fix et al. | |
| 2021/0397255 A1* | 12/2021 | Fix | .......................... G06F 3/013 |
| 2023/0413650 A1* | 12/2023 | Kim | ...................... G06F 1/1637 |

FOREIGN PATENT DOCUMENTS

| | | | | | |
|---|---|---|---|---|---|
| CN | 114660803 A | * | 6/2022 | ............. | G02B 27/01 |
| KR | 10-2022-0146212 A | | 11/2022 | | |
| KR | 10-2519547 B1 | | 4/2023 | | |

* cited by examiner

*Primary Examiner* — Cory A Almeida
(74) *Attorney, Agent, or Firm* — Womble Bond Dickinson (US) LLP

(57)　　　　　　　ABSTRACT

Provided are a display device and a mobile electronic device. A display device includes a display panel, a pancake lens for controlling a path of a display light outputted from the display panel, a light-receiving sensor overlapping a dummy area of the display panel, the dummy area being at an outer edge of a field of view of the pancake lens, a circuit substrate including a driving circuit for driving the display panel and a power circuit, and a light source configured to output near-infrared light to be recognized by the light-receiving sensor.

20 Claims, 18 Drawing Sheets

DISPLAY DEVICE AND MOBILE ELECTRONIC DEVICE FOR DISPLAYING VIRTUAL REALITY OR AUGMENTED REALITY

CROSS-REFERENCE TO RELATED APPLICATION

The present application claims priority to, and the benefit of, Korean Patent Application No. 10-2024-0047994, filed on Apr. 9, 2024, in the Korean Intellectual Property Office, the entire disclosure of which is incorporated herein by reference.

BACKGROUND

1. Field

Aspects of one or more embodiments of the present disclosure relate to a display device and a mobile electronic device.

2. Description of the Related Art

A wearable device that forms a focus at a short distance from a user's eyes is being developed in the form of glasses or a helmet. For example, the wearable device may be a head-mounted display (HMD) device or augmented reality (AR) glasses. Such a wearable device provides an AR screen or a virtual reality (VR) screen to a user.

The wearable device, such as the HMD device or the AR glasses, may suitably use a display specification of a minimum of about 2000 PPI (the number of pixels per inch) to allow a user to use it for a long time without dizziness. To this end, an organic light-emitting diode on silicon (OLE-DoS) technology, which is related to a high-resolution compact organic light-emitting display device, has emerged. The OLEDoS technology is the technology for arranging an organic light-emitting diode (OLED) on a semiconductor wafer substrate on which a complementary metal oxide semiconductor (CMOS) is located.

The wearable device tracks movement of a user's eyes and varies resolution of a screen based on the tracked movement of the user's eyes when displaying an AR screen or a VR screen. For example, the wearable device detects a direction of the user's gaze, and determines a central vision area corresponding to the gaze and a peripheral vision area except the central vision area. A foveated rendering technology for displaying a high-resolution screen on the central vision area and displaying a low-resolution screen on the peripheral vision area may be applied to the wearable device. The wearable device may irradiate near-infrared light having an output wavelength of about 780 nm to about 1400 nm to the user's eyes to track the movement of the user's eyes, and may detect the near-infrared light reflected from the user's eyes.

SUMMARY

Aspects of some embodiments of the present disclosure include a display device and a mobile electronic device capable of reducing the weight and volume by optimizing the position of a light-receiving sensor receiving near-infrared light for eye-tracking function.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to some embodiments of the present disclosure, a display device includes a display panel, a pancake lens for controlling a path of a display light outputted from the display panel, a light-receiving sensor overlapping a dummy area of the display panel, the dummy area being at an outer edge of a field of view of the pancake lens, a circuit substrate including a driving circuit for driving the display panel and a power circuit, and a light source configured to output near-infrared light to be recognized by the light-receiving sensor.

The display panel may include a first corner area, a second corner area, a third corner area, and fourth corner area positioned on the outer edge of the field of view of the pancake lens, wherein the light-receiving sensor overlaps the first corner area, the second corner area, the third corner area, and the fourth corner area.

The light-receiving sensor may be at a top of the first corner area, the second corner area, the third corner area, and the fourth corner area.

The light-receiving sensor may be between the display panel and the pancake lens.

The light-receiving sensor may be at a bottom of the first corner area, the second corner area, the third corner area, and the fourth corner area, wherein the first corner area, the second corner area, the third corner area, and the fourth corner area include a transparent area in which no light-emitting element is located.

The light-receiving sensor may be between the display panel and the circuit substrate.

The light-receiving sensor may be configured to detect the near-infrared light.

The display panel may include a silicon substrate, and a light-emitting element on the silicon substrate.

The circuit substrate may include a control circuit configured to track eye movement of a user by using the light-receiving sensor, and configured to control a screen of the display panel based on the eye movement.

The circuit substrate may be of a timing controller.

According to some embodiments of the present disclosure, an eyeglasses-type mobile electronic device for displaying virtual reality or augmented reality includes a display panel, a pancake lens for controlling a path of a display light outputted from the display panel, a light-receiving sensor overlapping a dummy area of the display panel, the dummy area being on an outer edge of a field of view of the pancake lens, a circuit substrate including a driving circuit for driving the display panel and a power circuit, and a light source configured to output near-infrared light recognized by the light-receiving sensor.

The display panel may include a first corner area, a second corner area, a third corner area, and fourth corner area at the outer edge of the field of view of the pancake lens, wherein the light-receiving sensor overlaps the first corner area, the second corner area, the third corner area, and the fourth corner area.

The light-receiving sensor may be at a top of the first corner area, the second corner area, the third corner area, and the fourth corner area.

The light-receiving sensor may be between the display panel and the pancake lens.

The light-receiving sensor may be at a bottom of the first corner area, the second corner area, the third corner area, and the fourth corner area, wherein the first corner area, the second corner area, the third corner area, and the fourth corner area include a transparent area in which no light-emitting element is located.

The light-receiving sensor may be between the display panel and the circuit substrate.

The light-receiving sensor may be configured to detect the near-infrared light.

The display panel may include a silicon substrate, and a light-emitting element on the silicon substrate.

The circuit substrate may include a control circuit configured to track eye movement of a user by using the light-receiving sensor, and configured to control a screen of the display panel based on the eye movement.

The control circuit may be of a timing controller.

The display device and the mobile electronic device according to the embodiments may reduce the weight and volume by optimizing the position of a light-receiving sensor receiving near-infrared light for eye-tracking function.

BRIEF DESCRIPTION OF THE DRAWINGS

The above and other embodiments of the present disclosure will become more apparent by describing aspects of some embodiments thereof with reference to the attached drawings, in which:

FIG. 9 is an exploded perspective view illustrating an example of the head-mounted display of FIG. 8;

DETAILED DESCRIPTION

Figure 1:
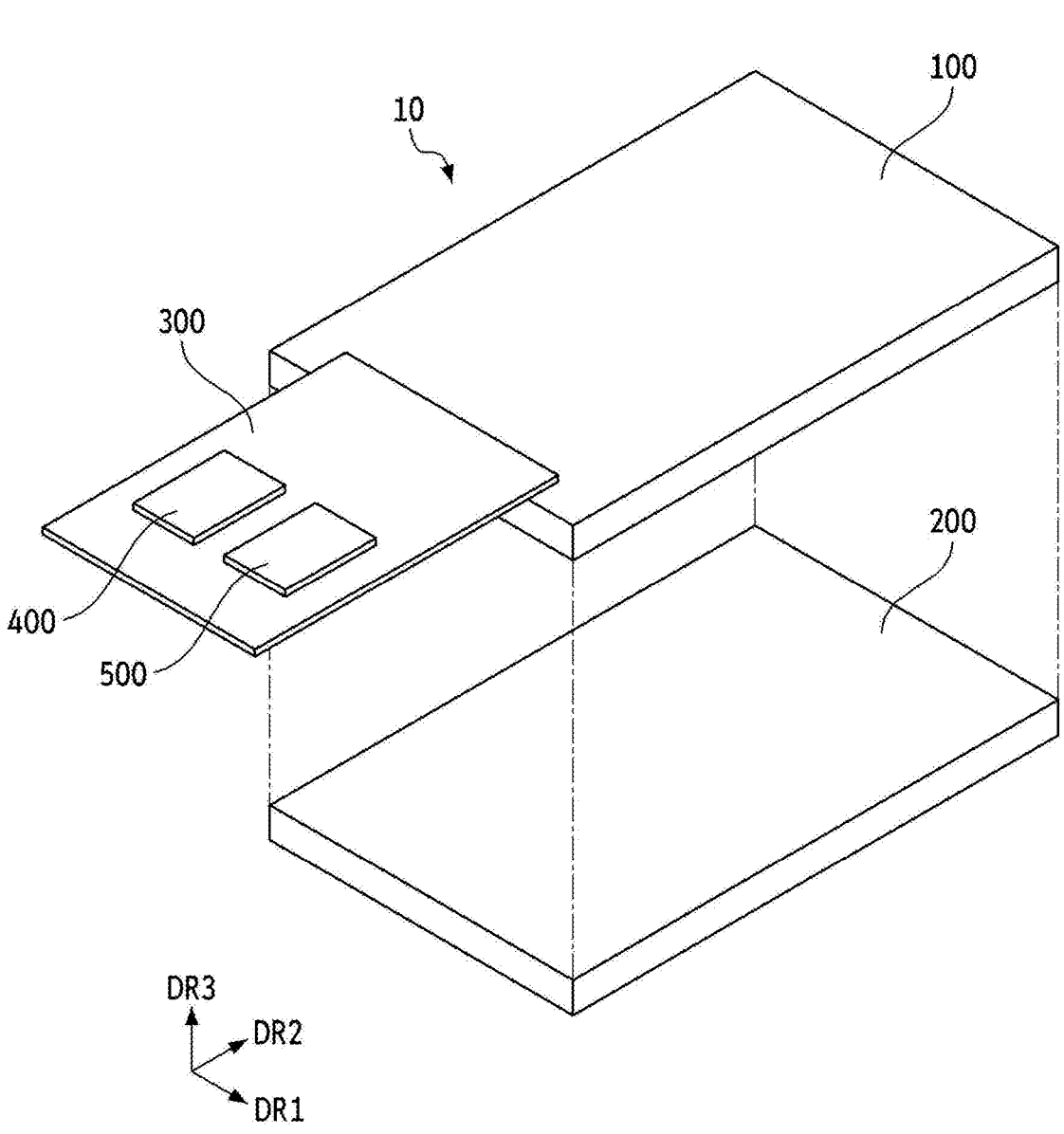
FIG. 1 is an exploded perspective view showing a display device according to one or more embodiments.

Aspects and features of embodiments of the present disclosure and methods of accomplishing the same may be understood more readily by reference to the detailed description of embodiments and the accompanying drawings. Hereinafter, aspects of some embodiments will be described in more detail with reference to the accompanying drawings. The described embodiments, however, may be embodied in various different forms, and should not be construed as being limited to only the illustrated embodiments herein. Rather, these embodiments are provided as examples so that the present disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure might not be described.

Unless otherwise noted, like reference numerals, characters, or combinations thereof denote like elements throughout the attached drawings and the written description, and thus, descriptions thereof will not be repeated. Further, parts not related to the description of one or more embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the present disclosure. Thus, embodiments disclosed herein should not be construed as limited to the particular illustrated shapes of regions, but are to include deviations in shapes that result from, for instance, manufacturing.

For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "in a plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components, such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of the present disclosure, expressions, such as "at least one of," "one of," and "selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, XZ, YZ, and ZZ, or any variation thereof. Similarly, the expression, such as "at least one of A and/or B" may include A, B, or A and B. As used herein, the term "and/or" includes any and all combinations of one or more of the associated listed items. For example, the expression, such as "A and/or B" may include A, B, or A and B. Further, the use of "may" when describing embodiments of the present disclosure refers to "one or more embodiments of the present disclosure".

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to one or more embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning for example consistent with their meaning in the context of the relevant art and/or the present specification, and should not be interpreted in an idealized or overly formal sense, unless expressly so defined herein.

Figure 2:
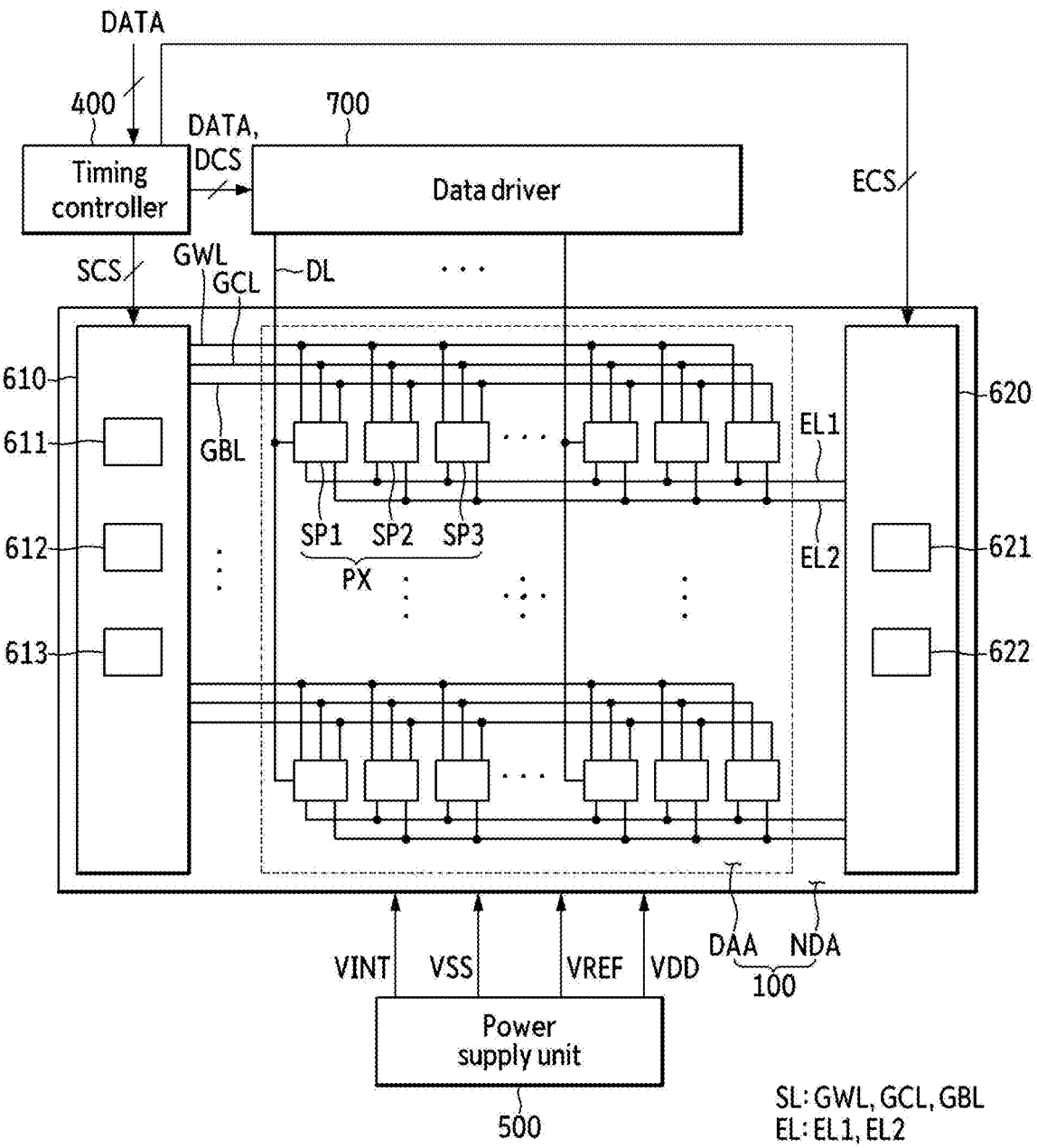
FIG. 2 is a block diagram illustrating a display device according to one or more embodiments.

FIG. 1 is an exploded perspective view showing a display device according to one or more embodiments. FIG. 2 is a block diagram illustrating a display device according to one or more embodiments.

Referring to FIGS. 1 and 2, a display device 10 according to one or more embodiments is a device displaying a moving image or a still image. The display device 10 according to one or more embodiments may be applied to portable electronic devices, such as a mobile phone, a smartphone, a tablet personal computer, a mobile communication terminal, an electronic organizer, an electronic book, a portable multimedia player (PMP), a navigation system, an ultra-mobile PC (UMPC) or the like. For example, the display device 10 according to one or more embodiments may be applied as a display unit of a television, a laptop, a monitor, a billboard, or an Internet-of-Things (IoT) terminal. Alternatively, the display device 10 according to one or more embodiments may be applied to a smart watch, a watch phone, a head-mounted display (HMD) for implementing virtual reality and augmented reality, and the like.

The display device 10 according to one or more embodiments includes a display panel 100, a heat dissipation layer 200, a circuit board 300, a timing controller 400, and a power supply circuit 500.

The display panel 100 may have a planar shape similar to a quadrilateral shape. For example, the display panel 100 may have a planar shape similar to a quadrilateral shape, having a short side of a first direction DR1, and a long side of a second direction DR2 intersecting the first direction DR1. In the display panel 100, a corner where a short side in the first direction DR1 and a long side in the second direction DR2 meet may be right-angled or rounded with a curvature (e.g., predetermined curvature). The planar shape of the display panel 100 is not limited to a quadrilateral shape, and may be a shape similar to another polygonal shape, a circular shape, or an elliptical shape. The planar shape of the display device 10 may conform to the planar shape of the display panel 100, but the present specification is not limited thereto.

The display panel 100 includes a display area DAA for displaying an image, and a non-display area NDA not displaying an image, as shown in FIG. 2.

The display area DAA includes a plurality of pixels PX, a plurality of scan lines SL, a plurality of emission control lines EL, and a plurality of data lines DL.

The plurality of pixels PX may be arranged in a matrix form in the first direction DR1 and the second direction DR2. The plurality of scan lines SL and the plurality of emission control lines EL may extend in the first direction DR1, while being arranged in the second direction DR2. The plurality of data lines DL may extend in the second direction DR2, while being arranged in the first direction DR1.

The plurality of scan lines SL include a plurality of write scan lines GWL, a plurality of control scan lines GCL, and a plurality of bias scan lines GBL. The plurality of emission control lines EL include a plurality of first emission control lines EL1 and a plurality of second emission control lines EL2.

Figure 3:
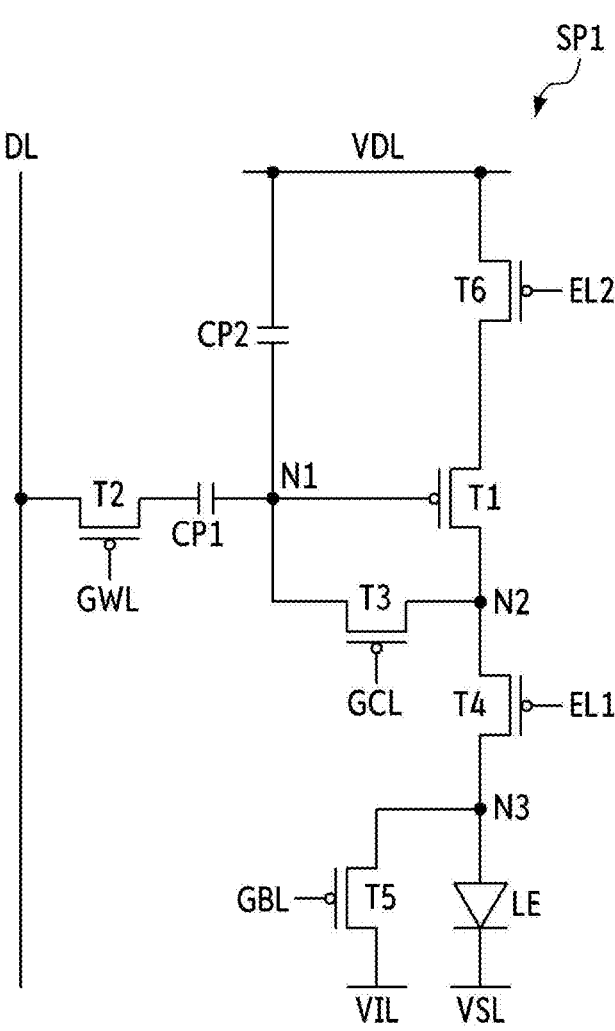
FIG. 3 is an equivalent circuit diagram of a first sub-pixel according to one or more embodiments.

The plurality of pixels PX include a plurality of sub-pixels SP1, SP2, and SP3. The plurality of sub-pixels SP1, SP2, and SP3 may include a plurality of pixel transistors as shown in FIG. 3, and the plurality of pixel transistors may be formed by a semiconductor process, and may be located on a semiconductor substrate SSUB (see FIG. 7). For example, the plurality of pixel transistors of a data driver 700 may be formed of complementary metal oxide semiconductor (CMOS).

Each of the plurality of sub-pixels SP1, SP2, and SP3 may be connected to any one write scan line GWL among the plurality of write scan lines GWL, any one control scan line GCL among the plurality of control scan lines GCL, any one bias scan line GBL among the plurality of bias scan lines GBL, any one first emission control line EL1 among the plurality of first emission control lines EL1, any one second emission control line EL2 among the plurality of second emission control lines EL2, and any one data line DL among the plurality of data lines DL. Each of the plurality of sub-pixels SP1, SP2, and SP3 may receive a data voltage of the data line DL in response to a write scan signal of the write scan line GWL, and may emit light from the light-emitting element according to the data voltage.

The non-display area NDA includes a scan driver 610, an emission driver 620, and the data driver 700.

The scan driver 610 includes a plurality of scan transistors, and the emission driver 620 includes a plurality of light-emitting transistors. The plurality of scan transistors and the plurality of light-emitting transistors may be formed on the semiconductor substrate SSUB (see FIG. 7) through a semiconductor process. For example, the plurality of scan transistors and the plurality of light-emitting transistors may be formed of CMOS. Although it is illustrated in FIG. 2 that the scan driver 610 is located on the left side of the display area DAA, and that the emission driver 620 is located on the right side of the display area DAA, the present specification is not limited thereto. For example, the scan driver 610 and the emission driver 620 may be located on both the left side and/or the right side of the display area DAA.

The scan driver 610 may include a write scan signal output unit 611, a control scan signal output unit 612, and a bias scan signal output unit 613. Each of the write scan signal output unit 611, the control scan signal output unit 612, and the bias scan signal output unit 613 may receive a scan-timing control signal SCS from the timing controller 400. The write scan signal output unit 611 may generate write scan signals according to the scan-timing control signal SCS of the timing controller 400, and may output them sequentially to the write scan lines GWL. The control scan signal output unit 612 may generate control scan signals in response to the scan-timing control signal SCS, and may sequentially output them to the control scan lines GCL. The bias scan signal output unit 613 may generate bias scan signals according to the scan-timing control signal SCS, and may output them sequentially to bias scan lines GBL.

The emission driver 620 includes a first emission control driver 621 and a second emission control driver 622. Each of the first emission control driver 621 and the second emission control driver 622 may receive the emission-timing control signal ECS from the timing controller 400. The first emission control driver 621 may generate first emission control signals according to the emission-timing control signal ECS, and may sequentially output them to the first emission control lines EL1. The second emission control driver 622 may generate second emission control signals according to the emission-timing control signal ECS, and may sequentially output them to the second emission control lines EL2.

The data driver 700 may include a plurality of data transistors, and the plurality of data transistors may be formed on the semiconductor substrate SSUB (see FIG. 7) through a semiconductor process. For example, the plurality of data transistors may be formed of CMOS.

The data driver 700 may receive digital video data DATA and a data-timing control signal DCS from the timing controller 400. The data driver 700 converts the digital video data DATA into analog data voltages according to the data-timing control signal DCS, and outputs the analog data voltages to the data lines DL. In this case, the sub-pixels SP1, SP2, and SP3 are selected by the write scan signal of the scan driver 610, and data voltages may be supplied to the selected sub-pixels SP1, SP2, and SP3.

The heat dissipation layer 200 may overlap the display panel 100 in a third direction DR3, which is the thickness direction of the display panel 100. The heat dissipation layer 200 may be located on one surface of the display panel 100, for example, on the rear surface thereof. The heat dissipation layer 200 serves to dissipate heat generated from the display panel 100. The heat dissipation layer 200 may include a metal layer, such as graphite, silver (Ag), copper (Cu), or aluminum (Al) having high thermal conductivity.

The circuit board 300 may be electrically connected to a plurality of first pads PD1 (see FIG. 4) of a first pad portion PDA1 (see FIG. 4) of the display panel 100 by using a conductive adhesive member, such as an anisotropic conductive film. The circuit board 300 may be a flexible printed circuit board with a flexible material, or a flexible film. Although the circuit board 300 is illustrated in FIG. 1 as being unfolded, the circuit board 300 may be bent. In this case, one end of the circuit board 300 may be located on the rear surface of the display panel 100 and/or the rear surface of the heat dissipation layer 200. One end of the circuit board 300 may be an opposite end of the other end of the circuit board 300 connected to the plurality of first pads PD1 (see FIG. 4) of the first pad portion PDA1 (see FIG. 4) of the display panel 100 by using a conductive adhesive member.

The timing controller 400 may receive externally supplied digital video data DATA and timing signals. The timing controller 400 may generate the scan-timing control signal SCS, the emission-timing control signal ECS, and the data-timing control signal DCS for controlling the display panel 100 in response to the timing signals. The timing controller 400 may output the scan-timing control signal SCS to the scan driver 610, and may output the emission-timing control signal ECS to the emission driver 620. The timing controller 400 may output the digital video data DATA and the data-timing control signal DCS to the data driver 700.

The power supply circuit 500 may generate a plurality of panel driving voltages according to a power voltage from the outside. For example, the power supply circuit 500 may generate a first driving voltage VSS, a second driving voltage VDD, and a third driving voltage VINT, and may supply them to the display panel 100. The first driving voltage VSS, the second driving voltage VDD, and the third driving voltage VINT will be described later in conjunction with FIG. 3.

Each of the timing controller 400 and the power supply circuit 500 may be formed as an integrated circuit (IC), and may be attached to one surface of the circuit board 300. In this case, the scan-timing control signal SCS, the emission-timing control signal ECS, the digital video data DATA, and the data-timing control signal DCS of the timing controller 400 may be supplied to the display panel 100 through the circuit board 300. Further, the first driving voltage VSS, the second driving voltage VDD, and the third driving voltage VINT of the power supply circuit 500 may be supplied to the display panel 100 through the circuit board 300.

Alternatively, each of the timing controller 400 and the power supply circuit 500 may be located in the non-display area NDA of the display panel 100, similarly to the scan driver 610, the emission driver 620, and the data driver 700. In this case, the timing controller 400 may include a plurality of timing transistors, and each power supply circuit 500 may include a plurality of power transistors. The plurality of timing transistors and the plurality of power transistors may be formed on the semiconductor substrate SSUB (see FIG. 7) through a semiconductor process. For example, the plurality of timing transistors and the plurality of power transistors may be formed of CMOS. Each of the timing controller 400 and the power supply circuit 500 may be located between the data driver 700 and the first pad portion PDA1 (see FIG. 4).

FIG. 3 is an equivalent circuit diagram of a first sub-pixel according to one or more embodiments.

Referring to FIG. 3, the first sub-pixel SP1 may be connected to the write scan line GWL, the control scan line GCL, the bias scan line GBL, the first emission control line EL1, the second emission control line EL2, and the data line DL. Further, the first sub-pixel SP1 may be connected to a first driving voltage line VSL to which the first driving voltage VSS corresponding to a low potential voltage is applied, a second driving voltage line VDL to which the second driving voltage VDD corresponding to a high potential voltage is applied, and a third driving voltage line VIL to which the third driving voltage VINT corresponding to an initialization voltage is applied. That is, the first driving voltage line VSL may be a low potential voltage line, the second driving voltage line VDL may be a high potential voltage line, and the third driving voltage line VIL may be an initialization voltage line. In this case, the first driving voltage VSS may be lower than the third driving voltage VINT. The second driving voltage VDD may be higher than the third driving voltage VINT.

The first sub-pixel SP1 includes a plurality of transistors T1 to T6, a light-emitting element LE, a first capacitor CP1, and a second capacitor CP2.

The light-emitting element LE emits light in response to a driving current flowing through the channel of the first transistor T1. The emission amount of the light-emitting element LE may be proportional to the driving current. The light-emitting element LE may be located between the fourth transistor T4 and the first driving voltage line VSL. The first electrode of the light-emitting element LE may be connected to the drain electrode of the fourth transistor T4, and the second electrode thereof may be connected to the first driving voltage line VSL. The first electrode of the light-emitting element LE may be an anode electrode, and the second electrode of the light-emitting element LE may be a cathode electrode. The light-emitting element LE may be an organic light-emitting diode including a first electrode, a second electrode, and an organic light-emitting layer located between the first electrode and the second electrode, but the present specification is not limited thereto. For example, the light-emitting element LE may be an inorganic light-emitting element including a first electrode, a second electrode, and an inorganic semiconductor located between the first electrode and the second electrode, in which case the light-emitting element LE may be a micro light-emitting diode.

The first transistor T1 may be a driving transistor that controls a source-drain current (hereinafter referred to as a "driving current") flowing between the source electrode and the drain electrode thereof according to a voltage applied to the gate electrode thereof. The first transistor T1 includes a gate electrode connected to a first node N1, a source electrode connected to the drain electrode of the sixth transistor T6, and a drain electrode connected to a second node N2.

The second transistor T2 may be located between one electrode of the first capacitor CP1 and the data line DL. The second transistor T2 is turned on by the write scan signal of the write scan line GWL to connect the one electrode of the first capacitor CP1 to the data line DL. Accordingly, the data voltage of the data line DL may be applied to the one electrode of the first capacitor CP1. The second transistor T2 includes a gate electrode connected to the write scan line GWL, a source electrode connected to the data line DL, and a drain electrode connected to the one electrode of the first capacitor CP1.

The third transistor T3 may be located between the first node N1 and the second node N2. The third transistor T3 is turned on by the write control signal of the write control line GCL to connect the first node N1 to the second node N2. For this reason, because the gate electrode and the source electrode of the first transistor T1 are connected, the first transistor T1 may operate like a diode. The third transistor T3 includes a gate electrode connected to the write control line GCL, a source electrode connected to the second node N2, and a drain electrode connected to the first node N1.

The fourth transistor T4 may be connected between the second node N2 and a third node N3. The fourth transistor T4 is turned on by the first emission control signal of the first emission control line EL1 to connect the second node N2 to the third node N3. Accordingly, the driving current of the first transistor T1 may be supplied to the light-emitting element LE. The fourth transistor T4 includes a gate electrode connected to the first emission control line EL1, a source electrode connected to the second node N2, and a drain electrode connected to the third node N3.

The fifth transistor T5 may be located between the third node N3 and the third driving voltage line VIL. The fifth transistor T5 is turned on by the bias scan signal of the bias scan line GBL to connect the third node N3 to the third driving voltage line VIL. Accordingly, the third driving voltage VINT of the third driving voltage line VIL may be applied to the first electrode of the light-emitting element LE. The fifth transistor T5 includes a gate electrode connected to the bias scan line GBL, a source electrode connected to the third node N3, and a drain electrode connected to the third driving voltage line VIL.

The sixth transistor T6 may be located between the source electrode of the first transistor T1 and the second driving voltage line VDL. The sixth transistor T6 is turned on by the second emission control signal of the second emission control line EL2 to connect the source electrode of the first transistor T1 to the second driving voltage line VDL. Accordingly, the second driving voltage VDD of the second driving voltage line VDL may be applied to the source electrode of the first transistor T1. The sixth transistor T6 includes a gate electrode connected to the second emission control line EL2, a source electrode connected to the second driving voltage line VDL, and a drain electrode connected to the source electrode of the first transistor T1.

The first capacitor CP1 is formed between the first node N1 and the drain electrode of the second transistor T2. The first capacitor CP1 includes one electrode connected to the drain electrode of the second transistor T2 and the other electrode connected to the first node N1.

The second capacitor CP2 is formed between the gate electrode of the first transistor T1 and the second driving voltage line VDL. The second capacitor CP2 includes one electrode connected to the gate electrode of the first transistor T1 and the other electrode connected to the second driving voltage line VDL.

The first node N1 is a junction between the gate electrode of the first transistor T1, the drain electrode of the third transistor T3, the other electrode of the first capacitor CP1, and the one electrode of the second capacitor CP2. The second node N2 is a junction between the drain electrode of the first transistor T1, the source electrode of the third transistor T3, and the source electrode of the fourth transistor T4. The third node N3 is a junction between the drain electrode of the fourth transistor T4, the source electrode of the fifth transistor T5, and the first electrode of the light-emitting element LE.

Each of the first to sixth transistors T1 to T6 may be a metal-oxide-semiconductor field effect transistor (MOSFET). For example, each of the first to sixth transistors T1 to T6 may be a P-type MOSFET, but the present specification is not limited thereto. Each of the first to sixth transistors T1 to T6 may be an N-type MOSFET. Alternatively, some of the first to sixth transistors T1 to T6 may be P-type MOSFETs, and each of the remaining transistors may be an N-type MOSFET.

Although it is illustrated in FIG. 3 that the first sub-pixel SP1 includes six transistors T1 to T6 and two capacitors C1 and C2, it should be noted that the equivalent circuit diagram of the first sub-pixel SP1 is not limited to that shown in FIG. 3. For example, the number of transistors and the number of capacitors of the first sub-pixel SP1 are not limited to those shown in FIG. 3.

Further, the equivalent circuit diagram of the second sub-pixel SP2 and the equivalent circuit diagram of the third sub-pixel SP3 may be substantially the same as the equivalent circuit diagram of the first sub-pixel SP1 described in conjunction with FIG. 3. Therefore, the description of the equivalent circuit diagram of the second sub-pixel SP2 and the equivalent circuit diagram of the third sub-pixel SP3 is omitted in the present specification.

Figure 4:
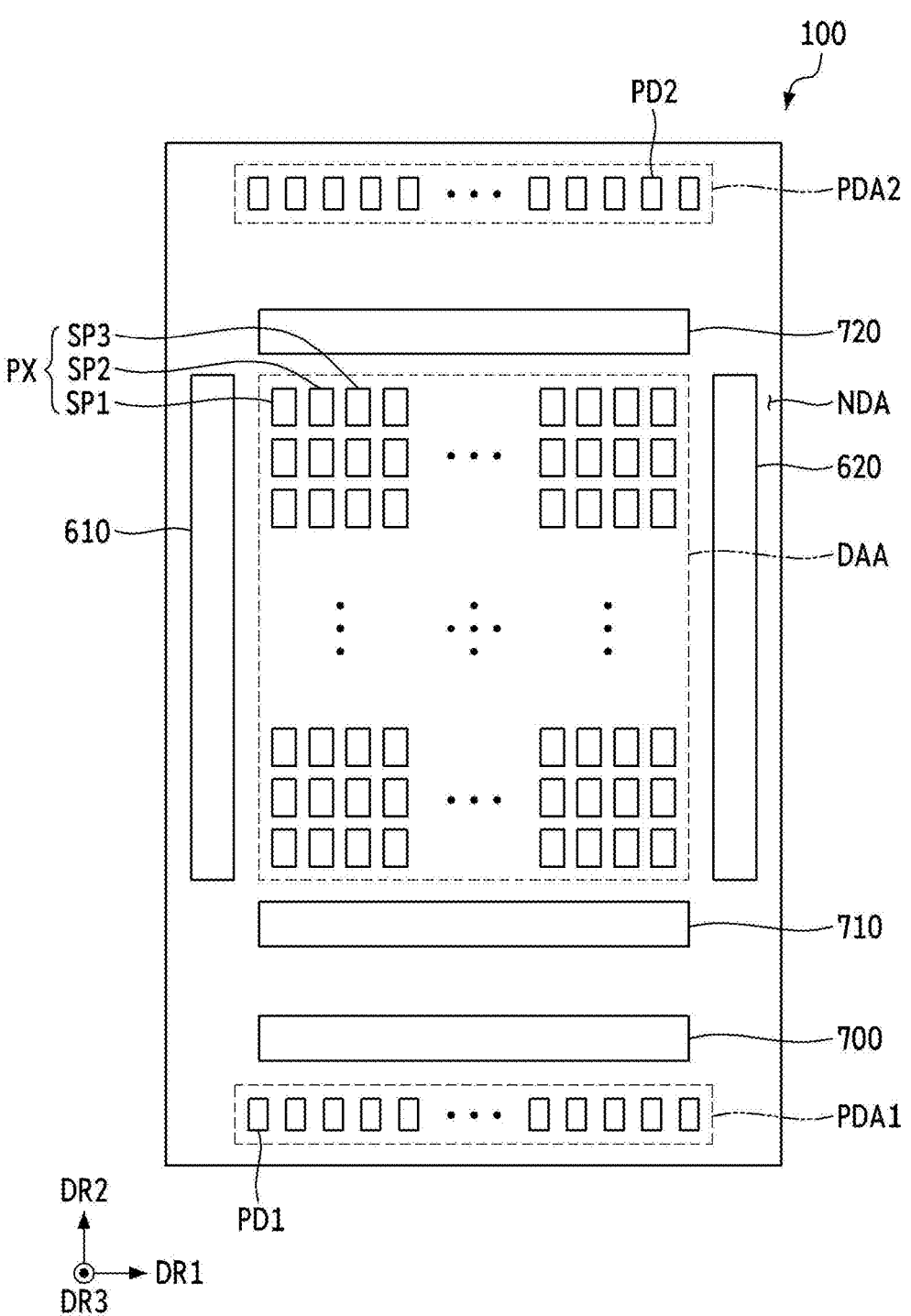
FIG. 4 is a layout diagram illustrating an example of a display panel according to one or more embodiments.

FIG. 4 is a layout diagram illustrating an example of a display panel according to one or more embodiments.

Referring to FIG. 4, the display area DAA of the display panel 100 according to one or more embodiments includes the plurality of pixels PX arranged in a matrix form. The non-display area NDA of the display panel 100 according to one or more embodiments includes the scan driver 610, the emission driver 620, the data driver 700, a first distribution circuit 710, a second distribution circuit 720, the first pad portion PDA1, and a second pad portion PDA2.

The scan driver 610 may be located on the first side of the display area DAA, and the emission driver 620 may be located on the second side of the display area DAA. For example, the scan driver 610 may be located on one side of the display area DAA in the first direction DR1, and the emission driver 620 may be located on the other side of the display area DAA in the first direction DR1. That is, the scan driver 610 may be located on the left side of the display area DAA, and the emission driver 620 may be located on the right side of the display area DAA. However, the present specification is not limited thereto, and the scan driver 610 and the emission driver 620 may be located on both the first side and the second side of the display area DAA.

The first pad portion PDA1 may include the plurality of first pads PD1 connected to pads or bumps of the circuit board 300 through a conductive adhesive member. The first pad portion PDA1 may be located on the third side of the display area DAA. For example, the first pad portion PDA1 may be located on one side of the display area DAA in the second direction DR2.

The first pad portion PDA1 may be located outside the data driver 700 in the second direction DR2. That is, the first pad portion PDA1 may be located closer to the edge of the display panel 100 than the data driver 700.

The second pad portion PDA2 may include a plurality of second pads PD2 corresponding to inspection pads that test whether the display panel 100 operates normally. The plurality of second pads PD2 may be connected to a jig or a probe pin during an inspection process, or may be connected to a circuit board for inspection. The circuit board for inspection may be a printed circuit board made of a rigid material or a flexible printed circuit board made of a flexible material.

The first distribution circuit 710 distributes data voltages applied through the first pad portion PDA1 to the plurality of data lines DL. For example, the first distribution circuit 710 may distribute the data voltages applied through one first pad PD1 of the first pad portion PDA1 to the P (P is a positive integer of 2 or more) data lines DL, and as a result, the number of the plurality of first pads PD1 may be reduced. The first distribution circuit 710 may be located on the third side of the display area DAA of the display panel 100. For example, the first distribution circuit 710 may be located on one side of the display area DAA in the second direction DR2. That is, the first distribution circuit 710 may be located on the lower side of the display area DAA (e.g., in plan view).

The second distribution circuit 720 distributes signals applied through the second pad portion PDA2 to the scan driver 610, the emission driver 620, and the data lines DL. The second pad portion PDA2 and the second distribution circuit 720 may be configured to inspect the operation of each of the pixels PX in the display area DAA. The second distribution circuit 720 may be located on the fourth side of the display area DAA of the display panel 100. For example, the second distribution circuit 720 may be located on the other side of the display area DAA in the second direction DR2. That is, the second distribution circuit 720 may be located on the upper side of the display area DAA.

Figure 5:
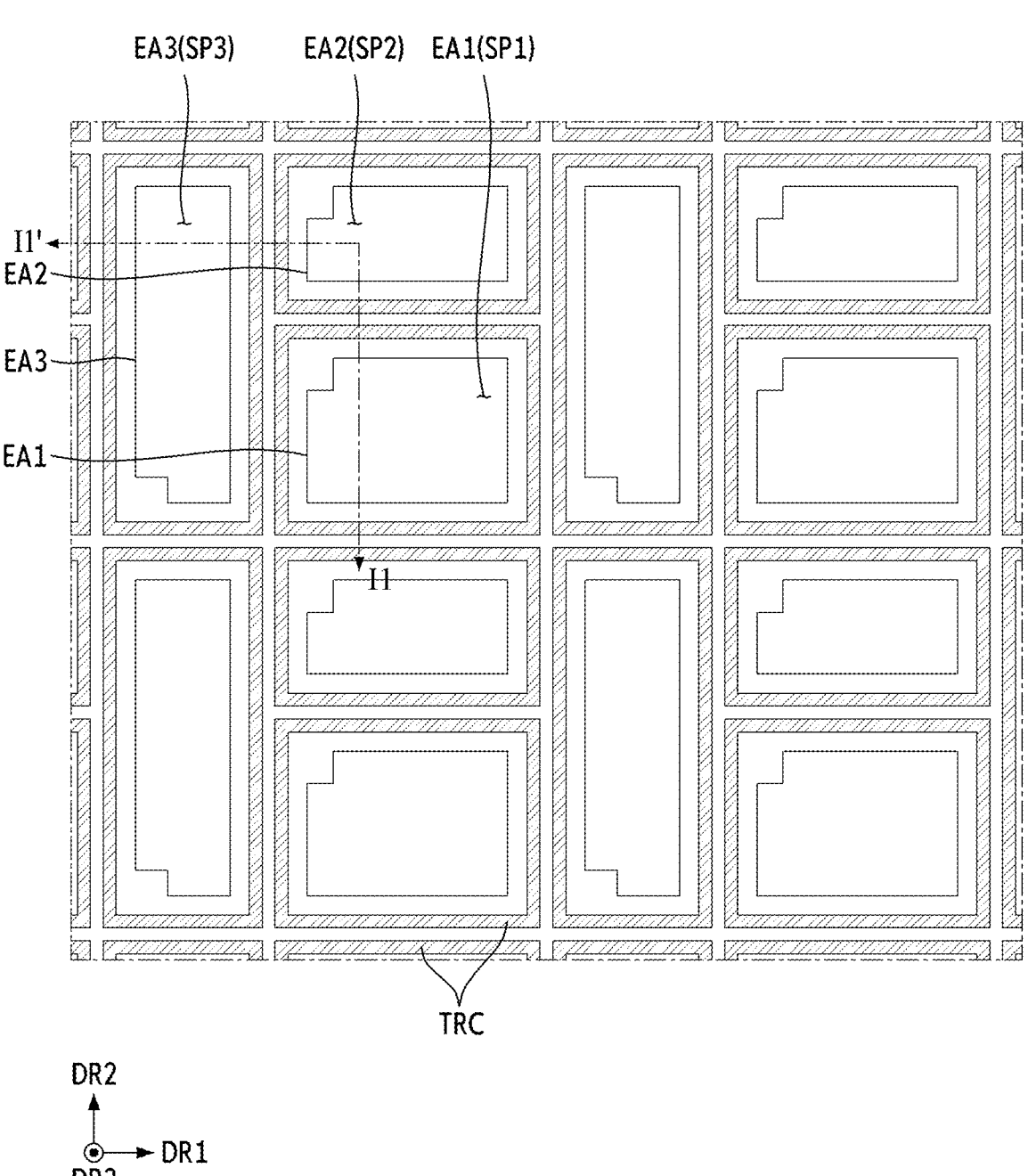
FIGS. 5 and 6 are layout diagrams illustrating embodiments of the display area of FIG. 4.
Figure 6:
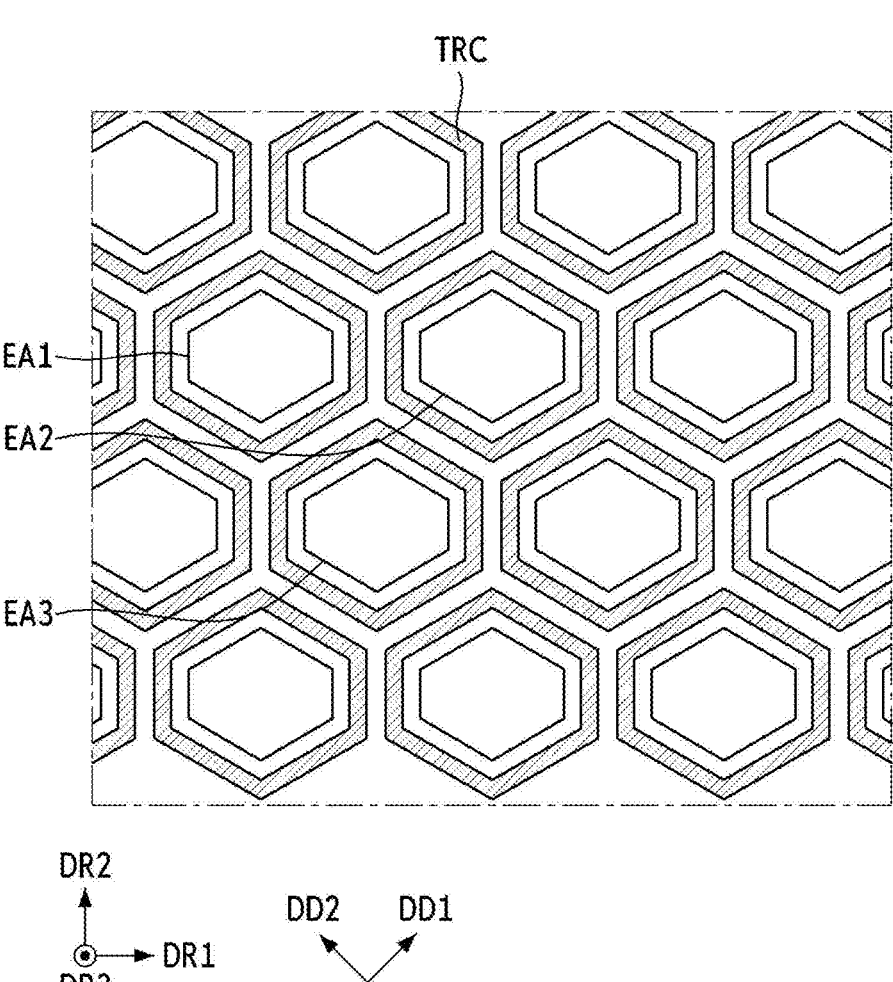

FIGS. 5 and 6 are layout diagrams illustrating embodiments of the display area of FIG. 4.

Referring to FIGS. 5 and 6, each of the pixels PX includes the first emission area EA1 that is an emission area of the first sub-pixel SP1, the second emission area EA2 that is an emission area of the second sub-pixel SP2, and the third emission area EA3 that is an emission area of the third sub-pixel SP3.

Each of the first emission area EA1, the second emission area EA2, and the third emission area EA3 may have a polygonal, circular, elliptical, or atypical shape in plan view.

The maximum length of the third emission area EA3 in the first direction DR1 may be less than the maximum length of the first emission area EA1 in the first direction DR1 and the maximum length of the second emission area EA2 in the first direction DR1. The maximum length of the first emission area EA1 in the first direction DR1 and the maximum length of the second emission area EA2 in the first direction DR1 may be substantially the same.

The maximum length of the third emission area EA3 in the second direction DR2 may be greater than the maximum length of the first emission area EA1 in the second direction DR2 and the maximum length of the second emission area EA2 in the second direction DR2. The maximum length of the first emission area EA1 in the second direction DR2 may be greater than the maximum length of the second emission area EA2 in the second direction DR2.

The first emission area EA1, the second emission area EA2, and the third emission area EA3 may have, in plan view, a hexagonal shape formed of six straight lines as shown in FIGS. 5 and 6, but the present specification is not limited thereto. The first emission area EA1, the second emission area EA2, and the third emission area EA3 may have a polygonal shape other than a hexagon, a circular shape, an elliptical shape, or an atypical shape in plan view.

As shown in FIG. 5, in each of the plurality of pixels PX, the first emission area EA1 and the second emission area EA2 may be adjacent to each other in the second direction DR2. Further, the first emission area EA1 and the third emission area EA3 may be adjacent to each other in the first direction DR1. In addition, the second emission area EA2 and the third emission area EA3 may be adjacent to each other in the first direction DR1. The area of the first emission area EA1, the area of the second emission area EA2, and the area of the third emission area EA3 may be different.

Alternatively, as shown in FIG. 6, the first emission area EA1 and the second emission area EA2 may be adjacent to each other in the first direction DR1, but the second emission area EA2 and the third emission area EA3 may be adjacent to each other in a first diagonal direction DD1, and the first emission area EA1 and the third emission area EA3 may be adjacent to each other in a second diagonal direction DD2. The first diagonal direction DD1 may be a direction between the first direction DR1 and the second direction DR2, and may refer to a direction inclined by 45 degrees with respect to the first direction DR1 and the second direction DR2, and the second diagonal direction DD2 may be a direction substantially perpendicular to the first diagonal direction DD1.

The first emission area EA1 may emit a first light, the second emission area EA2 may emit a second light, and the third emission area EA3 may emit a third light. Here, the first light may be light of a blue wavelength band, the second light may be light of a green wavelength band, and the third light may be light of a red wavelength band. For example, the blue wavelength band may be a wavelength band of light whose main peak wavelength is in the range of about 370 nm to about 460 nm, the green wavelength band may be a wavelength band of light whose main peak wavelength is in the range of about 480 nm to about 560 nm, and the red wavelength band may be a wavelength band of light whose main peak wavelength is in the range of about 600 nm to about 750 nm.

It is exemplified in FIGS. 5 and 6 that each of the plurality of pixels PX includes three emission areas EA1, EA2, and EA3, but the present specification is not limited thereto. That is, each of the plurality of pixels PX may include four emission areas.

In addition, the layout of the emission areas of the plurality of pixels PX is not limited to that illustrated in FIGS. 5 and 6. For example, the emission areas of the plurality of pixels PX may be located in a stripe structure in which the emission areas are arranged in the first direction DR1, a PenTile® structure (PenTile® being a registered trademark of Samsung Display Co., Ltd., Republic of Korea) in which the emission areas are arranged in a diamond shape, or a hexagonal structure in which the emission areas having, in plan view, a hexagonal shape are arranged side by side as shown in FIG. 6.

Figure 7:
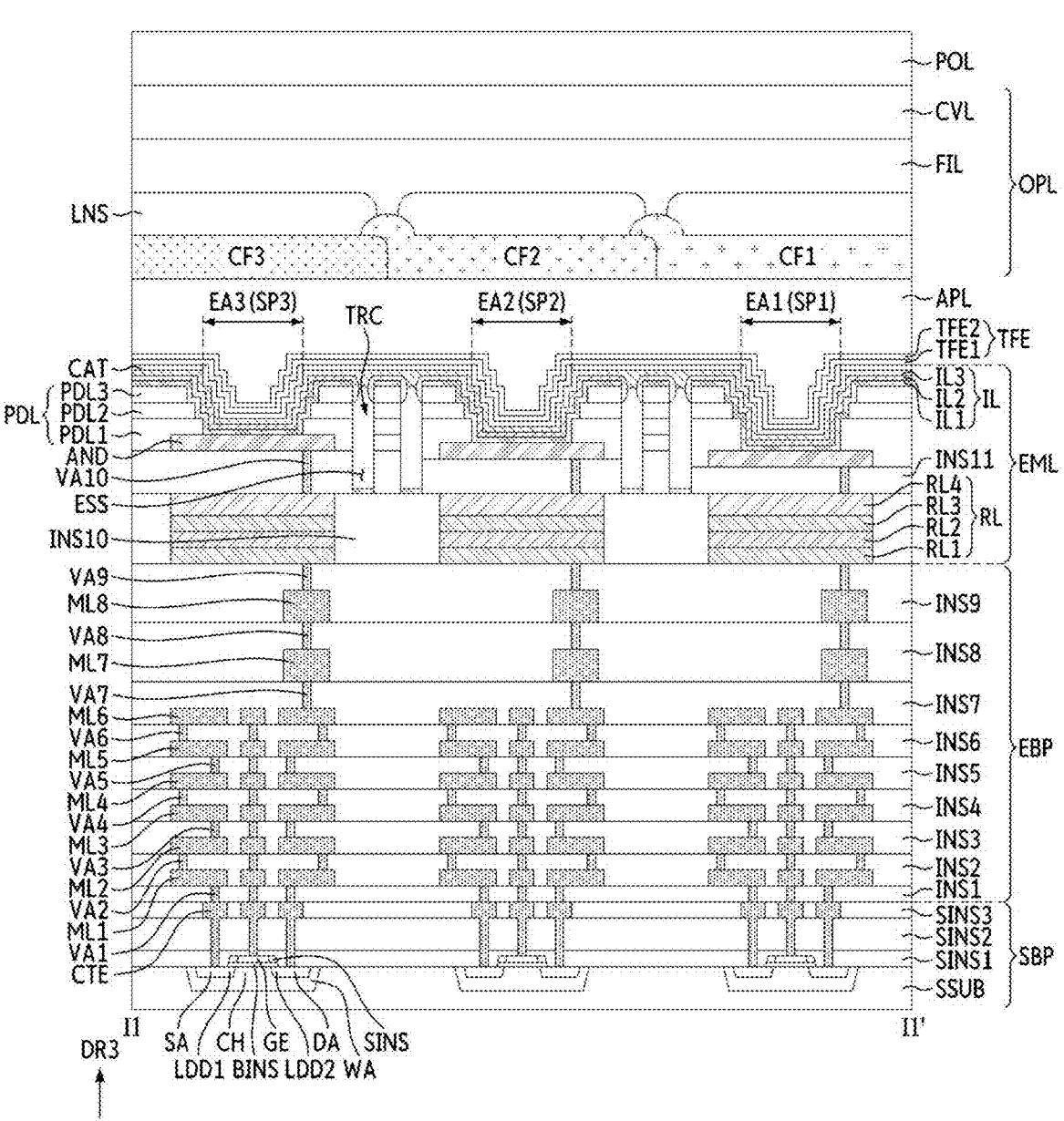
FIG. 7 is a cross-sectional view illustrating an example of a display panel taken along the line I1-I1' of FIG. 5.

FIG. 7 is a cross-sectional view illustrating an example of a display panel taken along the line I1-I1' of FIG. 5.

Referring to FIG. 7, the display panel 100 includes a semiconductor backplane SBP, a light-emitting element backplane EBP, a display element layer EML, an encapsulation layer TFE, an optical layer OPL, a cover layer CVL, and a polarizing plate POL.

The semiconductor backplane SBP includes the semiconductor substrate SSUB including a plurality of pixel transistors PTR, a plurality of semiconductor insulating layers covering the plurality of pixel transistors PTR, and a plurality of contact terminals CTE electrically connected to the plurality of pixel transistors PTR, respectively. The plurality of pixel transistors PTR may be the first to sixth transistors T1 to T6 described with reference to FIG. 4.

The semiconductor substrate SSUB may be a silicon substrate, a germanium substrate, or a silicon-germanium substrate. The semiconductor substrate SSUB may be a substrate doped with a first type impurity. A plurality of well regions WA may be located on the top surface of the semiconductor substrate SSUB. The plurality of well regions WA may be regions doped with a second type impurity. The second type impurity may be different from the aforementioned first type impurity. For example, when the first type impurity is a p-type impurity, the second type impurity may be an n-type impurity. Alternatively, when the first type impurity is an n-type impurity, the second type impurity may be a p-type impurity.

Each of the plurality of well regions WA includes a source region SA corresponding to the source electrode of the pixel transistor PTR, a drain region DA corresponding to the drain electrode thereof, and a channel region CH located between the source region SA and the drain region DA.

A lower insulating layer BINS may be located between a gate electrode GE and the well region WA. A side insulating layer SINS may be located on the side surface of the gate electrode GE. The side insulating layer SINS may be located on the lower insulating layer BINS.

Each of the source region SA and the drain region DA may be a region doped with the first type impurity. The gate electrode GE of the pixel transistor PTR may overlap the well region WA in the third direction DR3. The channel region CH may overlap the gate electrode GE in the third direction DR3. The source region SA may be located on one side of the gate electrode GE, and the drain region DA may be located on the other side of the gate electrode GE.

Each of the plurality of well regions WA further includes a first low-concentration impurity region LDD1 located between the channel region CH and the source region SA, and a second low-concentration impurity region LDD2 located between the channel region CH and the drain region DA. The first low-concentration impurity region LDD1 may be a region having a lower impurity concentration than the source region SA due to the lower insulating layer BINS. The second low-concentration impurity region LDD2 may be a region having a lower impurity concentration than the drain region DA due to the lower insulating layer BINS. The distance between the source region SA and the drain region DA may increase due to the presence of the first low-concentration impurity region LDD1 and the second low-concentration impurity region LDD2. Therefore, the length of the channel region CH of each of the pixel transistors PTR may increase, so that the likelihood of punch-through and hot carrier phenomena that might be caused by a short channel may be reduced or prevented.

A first semiconductor insulating layer SINS1 may be located on the semiconductor substrate SSUB. The first semiconductor insulating layer SINS1 may be formed of silicon carbonitride (SiCN) or a silicon oxide (SiOx)-based inorganic layer, but the present specification is not limited thereto.

A second semiconductor insulating layer SINS2 may be located on the first semiconductor insulating layer SINS1. The second semiconductor insulating layer SINS2 may be formed of a silicon oxide (SiOx)-based inorganic layer, but the present specification is not limited thereto.

The plurality of contact terminals CTE may be located on the second semiconductor insulating layer SINS2. Each of the plurality of contact terminals CTE may be connected to any one of the gate electrode GE, the source region SA, or the drain region DA of each of the pixel transistors PTR through holes penetrating the first semiconductor insulating layer SINS1 and the second semiconductor insulating layer INS2. The plurality of contact terminals CTE may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them.

A third semiconductor insulating layer SINS3 may be located on a side surface of each of the plurality of contact terminals CTE. The top surface of each of the plurality of contact terminals CTE may be exposed without being covered by the third semiconductor insulating layer SINS3. The third semiconductor insulating layer SINS3 may be formed of a silicon oxide (SiOx)-based inorganic layer, but the present specification is not limited thereto.

The semiconductor substrate SSUB may be replaced with a glass substrate or a polymer resin substrate, such as polyimide. In this case, thin film transistors may be located on the glass substrate or the polymer resin substrate. The glass substrate may be a rigid substrate that does not bend, and the polymer resin substrate may be a flexible substrate that can be bent or curved.

The light-emitting element backplane EBP includes a plurality of conductive layers ML1 to ML8, a plurality of vias VA1 to VA9, and a plurality of insulating layers INS1 to INS9. In addition, the light-emitting element backplane EBP includes the first to eighth conductive layers ML1 to ML8 respectively between insulating layers INS1 to INS9.

The first to eighth conductive layers ML1 to ML8 serve to connect the plurality of contact terminals CTE exposed from the semiconductor backplane SBP to thereby implement the circuit of the first sub-pixel SP1 shown in FIG. 3. For example, the first to sixth transistors T1 to T6 are merely formed on the semiconductor backplane SBP, and the connection of the first to sixth transistors T1 to T6 and the first and second capacitors C1 and C2 is accomplished through the first to eighth conductive layers ML1 to ML8. In addition, the connection between the drain region corresponding to the drain electrode of the fourth transistor T4, the source region corresponding to the source electrode of the fifth transistor T5, and the first electrode of the light-emitting element LE is also accomplished through the first to eighth conductive layers ML1 to ML8.

The first insulating layer INS1 may be located on the semiconductor backplane SBP. Each of the first vias VA1 may penetrate the first insulating layer INS1 to be connected to the contact terminal CTE exposed from the semiconductor backplane SBP. Each of the first conductive layers ML1 may be located on the first insulating layer INS1 and may be connected to the first via VA1.

The second insulating layer INS2 may be located on the first insulating layer INS1 and the first conductive layers ML1. Each of the second vias VA2 may penetrate the second insulating layer INS2, and may be connected to the exposed first conductive layer ML1. Each of the second conductive layers ML2 may be located on the second insulating layer INS2 and may be connected to the second via VA2.

The third insulating layer INS3 may be located on the second insulating layer INS2 and the second conductive layers ML2. Each of the third vias VA3 may penetrate the third insulating layer INS3, and may be connected to the exposed second conductive layer ML2. Each of the third conductive layers ML3 may be located on the third insulating layer INS3 and may be connected to the third via VA3.

A fourth insulating layer INS4 may be located on the third insulating layer INS3 and the third conductive layers ML3. Each of the fourth vias VA4 may penetrate the fourth insulating layer INS4, and may be connected to the exposed third conductive layer ML3. Each of the fourth conductive layers ML4 may be located on the fourth insulating layer INS4 and may be connected to the fourth via VA4.

A fifth insulating layer INS5 may be located on the fourth insulating layer INS4 and the fourth conductive layers ML4. Each of the fifth vias VA5 may penetrate the fifth insulating layer INS5, and may be connected to the exposed fourth conductive layer ML4. Each of the fifth conductive layers ML5 may be located on the fifth insulating layer INS5 and may be connected to the fifth via VA5.

A sixth insulating layer INS6 may be located on the fifth insulating layer INS5 and the fifth conductive layers ML5. Each of the sixth vias VA6 may penetrate the sixth insulating layer INS6, and may be connected to the exposed fifth conductive layer ML5. Each of the sixth conductive layers ML6 may be located on the sixth insulating layer INS6 and may be connected to the sixth via VA6.

A seventh insulating layer INS7 may be located on the sixth insulating layer INS6 and the sixth conductive layers ML6. Each of the seventh vias VA7 may penetrate the seventh insulating layer INS7, and may be connected to the exposed sixth conductive layer ML6. Each of the seventh conductive layers ML7 may be located on the seventh insulating layer INS7 and may be connected to the seventh via VA7.

An eighth insulating layer INS8 may be located on the seventh insulating layer INS7 and the seventh conductive layers ML7. Each of the eighth vias VA8 may penetrate the eighth insulating layer INS8, and may be connected to the exposed seventh conductive layer ML7. Each of the eighth conductive layers ML8 may be located on the eighth insulating layer INS8 and may be connected to the eighth via VA8.

The first to eighth conductive layers ML1 to ML8 and the first to eighth vias VA1 to VA8 may be formed of substantially the same material. The first to eighth conductive layers ML1 to ML8 and the first to eighth vias VA1 to VA8 may be formed of any one of copper (Cu), aluminum (AI), tungsten (W), molybdenum (Mo), chromium (Cr), gold (Au), titanium (Ti), nickel (Ni), or neodymium (Nd), or an alloy including any one of them. The first to eighth vias VA1 to VA8 may be made of substantially the same material. First to eighth insulating layers INS1 to INS8 may be formed of a silicon oxide (SiOx)-based inorganic layer, but the present specification is not limited thereto.

The thicknesses of the first conductive layer ML1, the second conductive layer ML2, the third conductive layer ML3, the fourth conductive layer ML4, the fifth conductive layer ML5, and the sixth conductive layer ML6 may be greater than the thicknesses of the first via VA1, the second via VA2, the third via VA3, the fourth via VA4, the fifth via VA5, and the sixth via VA6, respectively. The thickness of each of the second conductive layer ML2, the third conductive layer ML3, the fourth conductive layer ML4, the fifth conductive layer ML5, and the sixth conductive layer ML6 may be greater than the thickness of the first conductive layer ML1. The thickness of the second conductive layer ML2, the thickness of the third conductive layer ML3, the thickness of the fourth conductive layer ML4, the thickness of the fifth conductive layer ML5, and the thickness of the sixth conductive layer ML6 may be substantially the same. For example, the thickness of the first conductive layer ML1 may be approximately 1360 Å. The thickness of each of the second conductive layer ML2, the third conductive layer ML3, the fourth conductive layer ML4, the fifth conductive layer ML5, and the sixth conductive layer ML6 may be approximately 1440 Å. The thickness of each of the first via VA1, the second via VA2, the third via VA3, the fourth via VA4, the fifth via VA5, and the sixth via VA6 may be approximately 1150 Å.

The thickness of each of the seventh conductive layer ML7 and the eighth conductive layer ML8 may be greater than the thickness of the first conductive layer ML1, the thickness of the second conductive layer ML2, the thickness of the third conductive layer ML3, the thickness of the fourth conductive layer ML4, the thickness of the fifth conductive layer ML5, and the thickness of the sixth conductive layer ML6. The thickness of the seventh conductive layer ML7 and the thickness of the eighth conductive layer ML8 may be greater than the thickness of the seventh via VA7 and the thickness of the eighth via VA8, respectively. The thickness of each of the seventh via VA7 and the eighth via VA8 may be greater than the thickness of the first via VA1, the thickness of the second via VA2, the thickness of the third via VA3, the thickness of the fourth via VA4, the thickness of the fifth via VA5, and the thickness of the sixth via VA6. The thickness of the seventh conductive layer ML7 and the thickness of the eighth conductive layer ML8 may be substantially the same. For example, the thickness of each of the seventh conductive layer ML7 and the eighth conductive layer ML8 may be approximately 9000 Å. The thickness of each of the seventh via VA7 and the eighth via VA8 may be approximately 6000 Å.

The ninth insulating layer INS9 may be located on the eighth insulating layer INS8 and the eighth conductive layer ML8. The ninth insulating layer INS9 may be formed of a silicon oxide (SiOx)-based inorganic layer, but the present specification is not limited thereto.

Each of the ninth vias VA9 may penetrate the ninth insulating layer INS9, and may be connected to the exposed eighth conductive layer ML8. The ninth vias VA9 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. The thickness of the ninth via VA9 may be approximately 16500 Å.

The display element layer EML may be located on the light-emitting element backplane EBP. The display element layer EML may include light-emitting elements LE each including a reflective electrode layer RL, tenth and eleventh insulating layers INS10 and INS11, a tenth via VA10, the first electrode AND, a light-emitting stack IL, and a second electrode CAT. The display element layer may also include a pixel-defining layer PDL and a plurality of trenches TRC.

The reflective electrode layer RL may be located on the ninth insulating layer INS9. The reflective electrode layer RL may include at least one reflective electrode RL1, RL2, RL3, and RL4. For example, the reflective electrode layer RL may include first to fourth reflective electrodes RL1, RL2, RL3, and RL4 as shown in FIG. 7.

Each of the first reflective electrodes RL1 may be located on the ninth insulating layer INS9, and may be connected to the ninth via VA9. The first reflective electrodes RL1 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the first reflective electrodes RL1 may include titanium nitride (TiN).

Each of second reflective electrodes RL2 may be located on a corresponding one of the first reflective electrodes RL1. The second reflective electrodes RL2 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the second reflective electrodes RL2 may include aluminum (Al).

Each of the third reflective electrodes RL3 may be located on a corresponding one of the second reflective electrodes RL2. The third reflective electrodes RL3 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the third reflective electrodes RL3 may include titanium nitride (TiN).

The fourth reflective electrodes RL4 may be respectively located on the third reflective electrodes RL3. The fourth reflective electrodes RL4 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the fourth reflective electrodes RL4 may include titanium (Ti).

Because the second reflective electrode RL2 is an electrode that substantially reflects light from the light-emitting elements LE, the thickness of the second reflective electrode RL2 may be greater than the thickness of each of the first reflective electrode RL1, the third reflective electrode RL3, and the fourth reflective electrode RL4. For example, the thickness of each of the first reflective electrode RL1, the third reflective electrode RL3, and the fourth reflective electrode RL4 may be approximately 100 Å, and the thickness of the second reflective electrode RL2 may be approximately 850 Å.

The tenth insulating layer INS10 may be located on the ninth insulating layer INS9. The tenth insulating layer INS10 may be located between the reflective electrode layers RL adjacent to each other in a horizontal direction. The tenth insulating layer INS10 may be formed of a silicon oxide (SiOx)-based inorganic layer, but the present specification is not limited thereto.

The eleventh insulating layer INS11 may be located on the tenth insulating layer INS10 and the reflective electrode layer RL. The eleventh insulating layer INS11 may be formed of a silicon oxide (SiOx)-based inorganic layer, but the present specification is not limited thereto. The tenth insulating layer INS10 and the eleventh insulating layer INS11 may be an optical auxiliary layer through which light reflected by the reflective electrode layer RL passes, among light emitted from the light-emitting elements LE.

To match the resonance distance of the light emitted from the light-emitting elements LE in at least one of the first sub-pixel SP1, the second sub-pixel SP2, or the third sub-pixel SP3, the tenth insulating layer INS10 and the eleventh insulating layer INS11 may be omitted beneath the first electrode AND. For example, in one or more embodiments, the first electrode AND of the first sub-pixel SP1 may be directly located on the reflective electrode layer RL. The eleventh insulating layer INS11 may be located under the first electrode AND of the second sub-pixel SP2. The tenth insulating layer INS10 and the eleventh insulating layer INS11 may be located under the first electrode AND of the third sub-pixel SP3.

In summary, the distance between the first electrode AND and the reflective electrode layer RL may be different in the first sub-pixel SP1, the second sub-pixel SP2, and the third sub-pixel SP3. That is, to adjust the distance from the reflective electrode layer RL to the first electrode AND according to the main wavelength of the light emitted from each of the first sub-pixel SP1, the second sub-pixel SP2, and the third sub-pixel SP3, the presence or absence of the tenth insulating layer INS10 and the eleventh insulating layer INS11 may be set in each of the first sub-pixel SP1, the second sub-pixel SP2, and the third sub-pixel SP3. For example, the distance between the first electrode AND and the reflective electrode layer RL in the third sub-pixel SP3 may be greater than the distance between the first electrode AND and the reflective electrode layer RL in the second sub-pixel SP2 and greater than the distance between the first electrode AND and the reflective electrode layer RL in the first sub-pixel SP1. The distance between the first electrode AND and the reflective electrode layer RL in the second sub-pixel SP2 may be greater than the distance between the first electrode AND and the reflective electrode layer RL in the first sub-pixel SP1. However, the specification of the present disclosure is not limited thereto.

In addition, although the tenth insulating layer INS10 and the eleventh insulating layer INS11 are illustrated in the present specification, a twelfth insulating layer located under the first electrode AND of the first sub-pixel SP1 may be added. In this case, the eleventh insulating layer INS11 and the twelfth insulating layer may be located under the first electrode AND of the second sub-pixel SP2, and the tenth insulating layer INS10, the eleventh insulating layer INS11, and the twelfth insulating layer may be located under the first electrode AND of the third sub-pixel SP3.

Each of the tenth vias VA10 may penetrate the tenth insulating layer INS10 and/or the eleventh insulating layer INS11 in the second sub-pixel SP2 and the third sub-pixel SP3 and may be connected to the exposed fourth reflective electrode RL4. The tenth vias VA10 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. The thickness of the tenth via VA10 in the second sub-pixel SP2 may be less than the thickness of the tenth via VA10 in the third sub-pixel SP3.

The first electrode AND of each of the light-emitting elements LE may be located on the tenth insulating layer INS10 and connected to the tenth via VA10. The first electrode AND of each of the light-emitting elements LE may be connected to the drain region DA or source region SA of the pixel transistor PTR through the tenth via VA10, the first to fourth reflective electrodes RL1 to RL4, the first to ninth vias VA1 to VA9, the first to eighth conductive layers ML1 to ML8, and the contact terminal CTE. The first electrode AND of each of the light-emitting elements LE may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the first electrode AND of each of the light-emitting elements LE may be titanium nitride (TiN).

The pixel-defining layer PDL may be located on a portion of the first electrode AND of each of the light-emitting elements LE. The pixel-defining layer PDL may cover the edge of the first electrode AND of each of the light-emitting elements LE. The pixel-defining layer PDL may serve to partition the first emission areas EA1, the second emission areas EA2, and the third emission areas EA3.

The first emission area EA1 may be defined as an area in which the first electrode AND, the light-emitting stack IL, and the second electrode CAT are sequentially stacked in the first sub-pixel SP1 to emit light. The second emission area EA2 may be defined as an area in which the first electrode AND, the light-emitting stack IL, and the second electrode CAT are sequentially stacked in the second sub-pixel SP2 to emit light. The third emission area EA3 may be defined as an area in which the first electrode AND, the light-emitting stack IL, and the second electrode CAT are sequentially stacked in the third sub-pixel SP3 to emit light.

The pixel-defining layer PDL may include first to third pixel-defining layers PDL1, PDL2, and PDL3. The first pixel-defining layer PDL1 may be located on the edge of the first electrode AND of each of the light-emitting elements LE, the second pixel-defining layer PDL2 may be located on the first pixel-defining layer PDL1, and the third pixel-defining layer PDL3 may be located on the second pixel-defining layer PDL2. The first pixel-defining layer PDL1, the second pixel-defining layer PDL2, and the third pixel-defining layer PDL3 may be formed of a silicon oxide (SiOx)-based inorganic layer, but the present specification is not limited thereto. The first pixel-defining layer PDL1, the second pixel-defining layer PDL2, and the third pixel-defining layer PDL3 may each have a thickness of about 500 Å.

When the first pixel-defining layer PDL1, the second pixel-defining layer PDL2, and the third pixel-defining layer PDL3 are formed as one pixel-defining layer, the height of the one pixel-defining layer increases, so that a first encapsulation inorganic layer TFE1 may be cut off due to step coverage. Step coverage refers to the ratio of the degree of thin film coated on an inclined portion to the degree of thin film coated on a flat portion. The lower the step coverage, the more likely it is that the thin film will be cut off at inclined portions.

Therefore, to reduce or prevent the likelihood of the first encapsulation inorganic layer TFE1 being cut off due to the step coverage, the first pixel-defining layer PDL1, the second pixel-defining layer PDL2, and the third pixel-defining layer PDL3 may have a cross-sectional structure having a stepped portion. For example, the width of the first pixel-defining layer PDL1 may be greater than the width of the second pixel-defining layer PDL2 and greater than the width of the third pixel-defining layer PDL3. The width of the second pixel-defining layer PDL2 may be greater than the width of the third pixel-defining layer PDL3. The width of the first pixel-defining layer PDL1 refers to the horizontal length of the first pixel-defining layer PDL1 defined in the first direction DR1 and/or the second direction DR2.

Each of the plurality of trenches TRC may penetrate the first pixel-defining layer PDL1, the second pixel-defining layer PDL2, and the third pixel-defining layer PDL3. Furthermore, each of the plurality of trenches TRC may penetrate the eleventh insulating layer INS11. The tenth insulating layer INS10 may be partially recessed at each of the plurality of trenches TRC.

At least one trench TRC may be located between adjacent sub-pixels SP1, SP2, and SP3. Although FIG. 7 illustrates that two trenches TRC are located between adjacent sub-pixels SP1, SP2, and SP3, the present specification is not limited thereto.

The light-emitting stack IL may include a plurality of intermediate layers. FIG. 7 illustrates that the light-emitting stack IL has a three-tandem structure including the first stack layer IL1, the second stack layer IL2, and the third stack layer IL3, but the present specification is not limited thereto. For example, the light-emitting stack IL may have a two-tandem structure including two intermediate layers.

In the three-tandem structure, the light-emitting stack IL may have a tandem structure including a plurality of stack layers IL1, IL2, and IL3 that emit different respective lights. For example, the light-emitting stack IL may include the first stack layer IL1 that emits first light, the second stack layer IL2 that emits third light, and the third stack layer IL3 that emits second light. The first stack layer IL1, the second stack layer IL2, and the third stack layer IL3 may be sequentially stacked.

The first stack layer IL1 may have a structure in which a first hole transport layer, a first organic light-emitting layer that emits first light, and a first electron transport layer are sequentially stacked. The second stack layer IL2 may have a structure in which a second hole transport layer, a second organic light-emitting layer that emits third light, and a second electron transport layer are sequentially stacked. The third stack layer IL3 may have a structure in which a third hole transport layer, a third organic light-emitting layer that emits second light, and a third electron transport layer are sequentially stacked.

A first charge generation layer for supplying charges to the second stack layer IL2 and for supplying electrons to the first stack layer IL1 may be located between the first stack layer IL1 and the second stack layer IL2. The first charge generation layer may include an N-type charge generation layer that supplies electrons to the first stack layer IL1, and a P-type charge generation layer that supplies holes to the second stack layer IL2. The N-type charge generation layer may include a dopant of a metal material.

A second charge generation layer for supplying charges to the third stack layer IL3 and for supplying electrons to the second stack layer IL2 may be located between the second stack layer IL2 and the third stack layer IL3. The second charge generation layer may include an N-type charge generation layer that supplies electrons to the second stack layer IL2 and a P-type charge generation layer that supplies holes to the third stack layer IL3.

The first stack layer IL1 may be located on the first electrodes AND and the pixel-defining layer PDL, and may be located on the bottom surface of each trench TRC. Due to the trench TRC, the first stack layer IL1 may be cut off between adjacent sub-pixels SP1, SP2, and SP3. The second stack layer IL2 may be located on the first stack layer IL1. Due to the trench TRC, the second stack layer IL2 may be cut off between adjacent sub-pixels SP1, SP2, and SP3. A cavity or an empty space may be located between portions of the first stack layer IL1 and between portions of the second stack layer IL2. The third stack layer IL3 may be located on the second stack layer IL2. The third stack layer IL3 is not cut off by the trench TRC, and may cover the second stack layer IL2 in each of the trenches TRC. That is, in the three-tandem structure, each of the plurality of trenches TRC may be a structure for cutting off the first to second stack layers IL1 and IL2, the first charge generation layer, and the second charge generation layer of the display element layer EML between the sub-pixels SP1, SP2, and SP3 adjacent to each other. In addition, in the two-tandem structure, each of the trenches TRC may be a structure for cutting off the charge generation layer located between a lower intermediate layer and an upper intermediate layer, and the lower intermediate layer.

To stably cut off the first and second stack layers IL1 and IL2 of the display element layer EML between adjacent sub-pixels SP1, SP2, and SP3, the height of each of the plurality of trenches TRC may be greater than the height of the pixel-defining layer PDL. The height of each of the plurality of trenches TRC refers to the length of each of the plurality of trenches TRC in the third direction DR3. The height of the pixel-defining layer PDL refers to the length of the pixel-defining layer PDL in the third direction DR3. To cut off the first to third stack layers IL1, IL2, and/or IL3 of the display element layer EML between the neighboring sub-pixels SP1, SP2, and SP3, another structure may exist instead of the trench TRC. For example, instead of the trench TRC, a reverse tapered partition wall may be located on the pixel-defining layer PDL.

The number of the stack layers IL1, IL2, and IL3 that emit different lights is not limited to that shown in FIG. 7. For example, the light-emitting stack IL may include two intermediate layers. In this case, one of the two intermediate layers may be substantially the same as the first stack layer IL1, and the other may include a second hole transport layer, a second organic light-emitting layer, a third organic light-emitting layer, and a second electron transport layer. In this case, a charge generation layer for supplying electrons to one intermediate layer and supplying charges to the other intermediate layer may be located between the two intermediate layers.

In addition, FIG. 7 illustrates that the first to third stack layers IL1, IL2, and IL3 are all located in the first emission area EA1, the second emission area EA2, and the third emission area EA3, but the present specification is not limited thereto. For example, the first stack layer IL1 may be located in the first emission area EA1, and may not be located in the second emission area EA2 and the third emission area EA3. Furthermore, the second stack layer IL2 may be located in the second emission area EA2 and may not be located in the first emission area EA1 and the third emission area EA3. Further, the third stack layer IL3 may be located in the third emission area EA3 and may not be located in the first emission area EA1 and the second emission area EA2. In this case, first to third color filters CF1, CF2, and CF3 of the optical layer OPL may be omitted.

The second electrode CAT may be located on the third stack layer IL3. The second electrode CAT may be located on the third stack layer IL3 in each of the plurality of trenches TRC. The second electrode CAT may be formed of a transparent conductive material (TCO), such as ITO or IZO that can transmit light or a semi-transmissive conductive material, such as magnesium (Mg), silver (Ag), or an alloy of Mg and Ag. When the second electrode CAT is formed of a semi-transmissive conductive material, the light emission efficiency may be improved in each of the first to third sub-pixels SP1, SP2, and SP3 due to a micro-cavity effect.

The encapsulation layer TFE may be located on the display element layer EML. The encapsulation layer TFE may include at least one inorganic layer TFE1 and TFE2 to reduce or prevent permeation of oxygen or moisture into the display element layer EML. For example, the encapsulation layer TFE may include the first encapsulation inorganic layer TFE1, and a second encapsulation inorganic layer TFE2.

The first encapsulation inorganic layer TFE1 may be located on the second electrode CAT. The first encapsulation inorganic layer TFE1 may be formed as a multilayer in which one or more inorganic layers selected from silicon nitride (SiNx), silicon oxy nitride (SiON), and silicon oxide (SiOx) are alternately stacked. The first encapsulation inorganic layer TFE1 may be formed by a chemical vapor deposition (CVD) process.

The second encapsulation inorganic layer TFE2 may be located on the first encapsulation inorganic layer TFE1. The second encapsulation inorganic layer TFE2 may be formed of titanium oxide (TiOx) or aluminum oxide (AlOx), but the present specification is not limited thereto. The second encapsulation inorganic layer TFE2 may be formed by an atomic layer deposition (ALD) process. The thickness of the second encapsulation inorganic layer TFE2 may be less than the thickness of the first encapsulation inorganic layer TFE1.

An organic layer APL may be a layer for increasing the interfacial adhesion between the encapsulation layer TFE and the optical layer OPL. The organic layer APL may be an organic layer, such as acrylic resin, epoxy resin, phenolic resin, polyamide resin, or polyimide resin.

The optical layer OPL includes a plurality of color filters CF1, CF2, and CF3, a plurality of lenses LNS, and a filling layer FIL. The plurality of color filters CF1, CF2, and CF3 may include the first to third color filters CF1, CF2, and CF3. The first to third color filters CF1, CF2, and CF3 may be located on the organic layer APL.

The first color filter CF1 may overlap the first emission area EA1 of the first sub-pixel SP1. The first color filter CF1 may transmit first light (e.g., light of a blue wavelength band). The blue wavelength band may be approximately 370 nm to approximately 460 nm. Thus, the first color filter CF1 may transmit first light among light emitted from the first emission area EA1.

The second color filter CF2 may overlap the second emission area EA2 of the second sub-pixel SP2. The second color filter CF2 may transmit second light (e.g., light of a green wavelength band). The green wavelength band may be approximately 480 nm to approximately 560 nm. Thus, the second color filter CF2 may transmit second light among light emitted from the second emission area EA2.

The third color filter CF3 may overlap the third emission area EA3 of the third sub-pixel SP3. The third color filter CF3 may transmit third light (e.g., light of a red wavelength band). The red wavelength band may be approximately 600 nm to approximately 750 nm. Thus, the third color filter CF3 may transmit third light among light emitted from the third emission area EA3.

Lenses LNS may be located on the first color filter CF1, the second color filter CF2, and the third color filter CF3, respectively. Each of the plurality of lenses LNS may be a structure for increasing a ratio of light directed to the front of the display device 10. Each of the plurality of lenses LNS may have a cross-sectional shape that is convex in an upward direction.

The filling layer FIL may be located on the plurality of lenses LNS. The filling layer FIL may have a refractive index (e.g., predetermined refractive index) such that light travels in the third direction DR3 at an interface between the filling layer FIL and the plurality of lenses LNS. Further, the filling layer FIL may be a planarization layer. The filling layer FIL may be an organic layer, such as acrylic resin, epoxy resin, phenolic resin, polyamide resin, or polyimide resin.

The cover layer CVL may be located on the filling layer FIL. The cover layer CVL may be a glass substrate or a polymer resin. When the cover layer CVL is a glass substrate, it may be attached onto the filling layer FIL. In this case, the filling layer FIL may serve to bond the cover layer CVL. When the cover layer CVL is a glass substrate, it may serve as an encapsulation substrate. When the cover layer CVL is a polymer resin, it may be directly applied onto the filling layer FIL.

The polarizing plate POL may be located on one surface of the cover layer CVL. The polarizing plate POL may be a structure for reducing or preventing visibility degradation caused by reflection of external light. The polarizing plate POL may include a linear polarizing plate and a phase retardation film. For example, the phase retardation film may be a λ/4 plate (quarter-wave plate), but the present specification is not limited thereto. However, when visibility degradation caused by reflection of external light is sufficiently overcome by the first to third color filters CF1, CF2, and CF3, the polarizing plate may be omitted.

Figure 8:
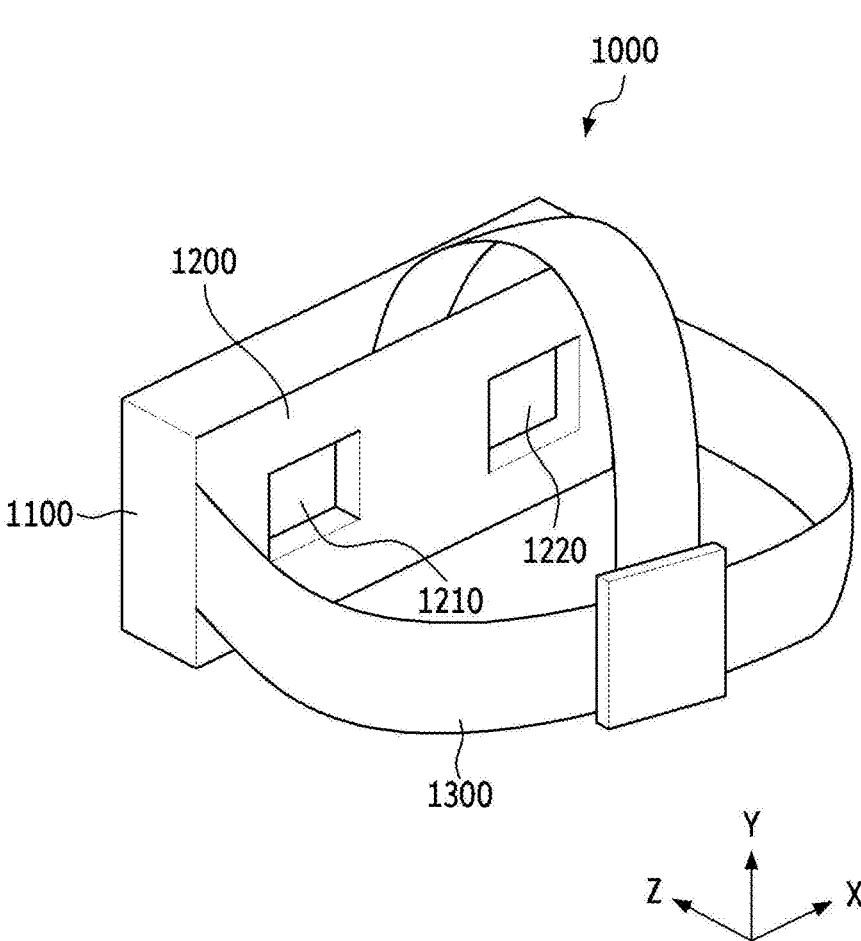
FIG. 8 is a perspective view illustrating a head-mounted display according to one or more embodiments.
Figure 9:
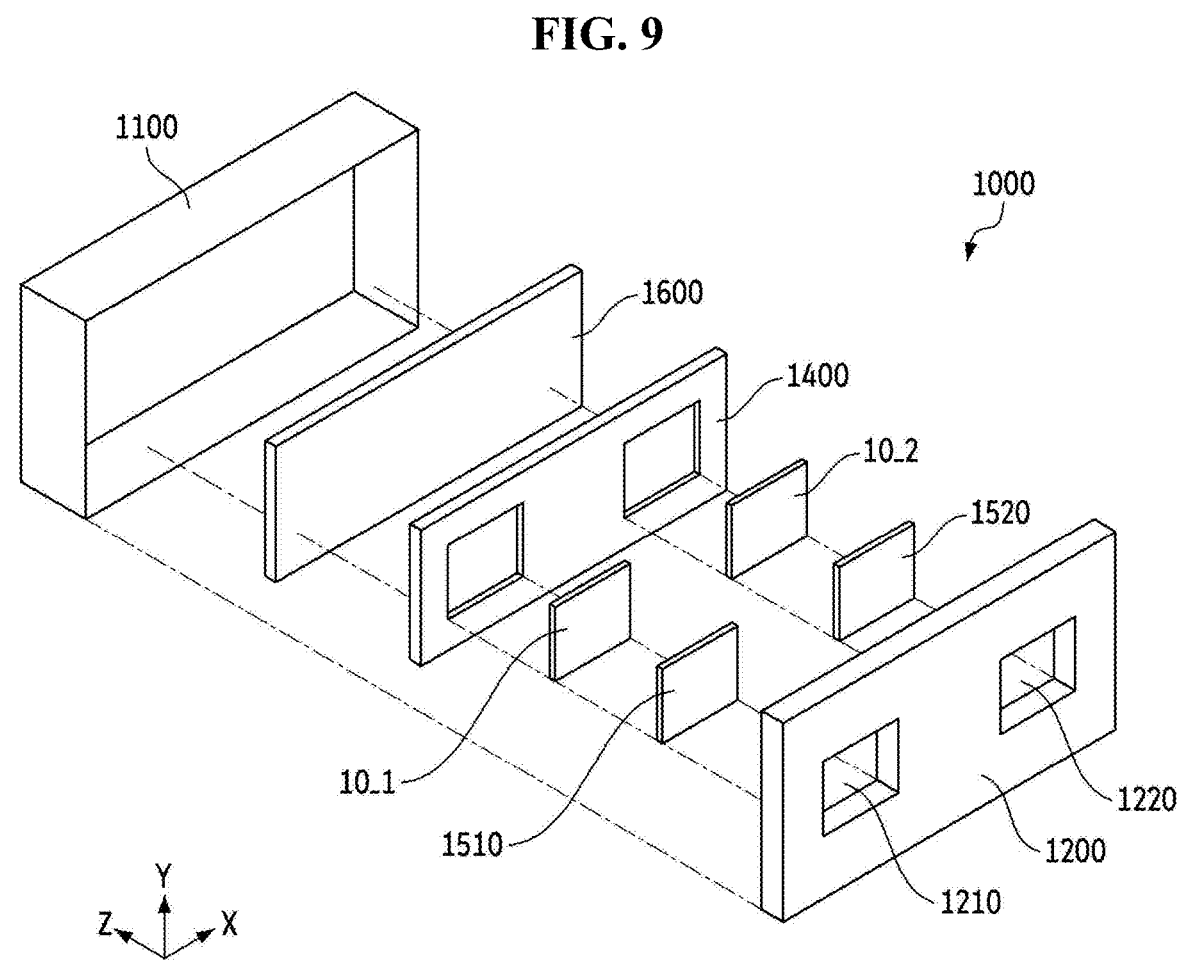

FIG. 8 is a perspective view illustrating a head-mounted display according to one or more embodiments. FIG. 9 is an exploded perspective view illustrating an example of the head-mounted display of FIG. 8.

Referring to FIGS. 8 and 9, a head-mounted display 1000 according to one or more embodiments includes a first display device 10_1, a second display device 10_2, a display device housing 1100, a housing cover 1200, a first eyepiece 1210, a second eyepiece 1220, a head-mounted band 1300, a middle frame 1400, a first optical member 1510, a second optical member 1520, and a control circuit board 1600.

The first display device 10_1 provides an image to the user's left eye, and the second display device 10_2 provides an image to the user's right eye. Because each of the first display device 10_1 and the second display device 10_2 is substantially the same as the display device 10 described in conjunction with FIGS. 1 and 2, a description of the first display device 10_1 and the second display device 10_2 will be omitted.

The first optical member 1510 may be located between the first display device 10_1 and the first eyepiece 1210. The second optical member 1520 may be located between the second display device 10_2 and the second eyepiece 1220. Each of the first optical member 1510 and the second optical member 1520 may include at least one convex lens.

The middle frame 1400 may be located between the first display device 10_1 and the control circuit board 1600, and between the second display device 10_2 and the control circuit board 1600. The middle frame 1400 serves to support and fix the first display device 10_1, the second display device 10_2, and the control circuit board 1600.

The control circuit board 1600 may be located between the middle frame 1400 and the display device housing 1100. The control circuit board 1600 may be connected to the first display device 10_1 and the second display device 10_2 through the connector. The control circuit board 1600 may convert an image source inputted from the outside into digital video data DATA, and may transmit the digital video data DATA to the first display device 10_1 and the second display device 10_2 through the connector.

The control circuit board 1600 may transmit the digital video data DATA corresponding to a left-eye image optimized for the user's left eye to the first display device 10_1, and may transmit the digital video data DATA corresponding to a right-eye image optimized for the user's right eye to the second display device 10_2. Alternatively, the control circuit board 1600 may transmit the same digital video data DATA to the first display device 10_1 and the second display device 10_2.

The display device housing 1100 serves to accommodate the first display device 10_1, the second display device 10_2, the middle frame 1400, the first optical member 1510, the second optical member 1520, and the control circuit board 1600. The housing cover 1200 covers one open surface of the display device housing 1100. The housing cover 1200 may include the first eyepiece 1210 at which the user's left eye is located and the second eyepiece 1220 at which the user's right eye is located. FIGS. 8 and 9 illustrate that the first eyepiece 1210 and the second eyepiece 1220 are located separately, but the present specification is not limited thereto. The first eyepiece 1210 and the second eyepiece 1220 may be combined into one.

The first eyepiece 1210 may be aligned with the first display device 10_1 and the first optical member 1510, and the second eyepiece 1220 may be aligned with the second display device 10_2 and the second optical member 1520. Therefore, the user may view, through the first eyepiece 1210, the image of the first display device 10_1 magnified as a virtual image by the first optical member 1510, and may view, through the second eyepiece 1220, the image of the second display device 10_2 magnified as a virtual image by the second optical member 1520.

Figure 10:
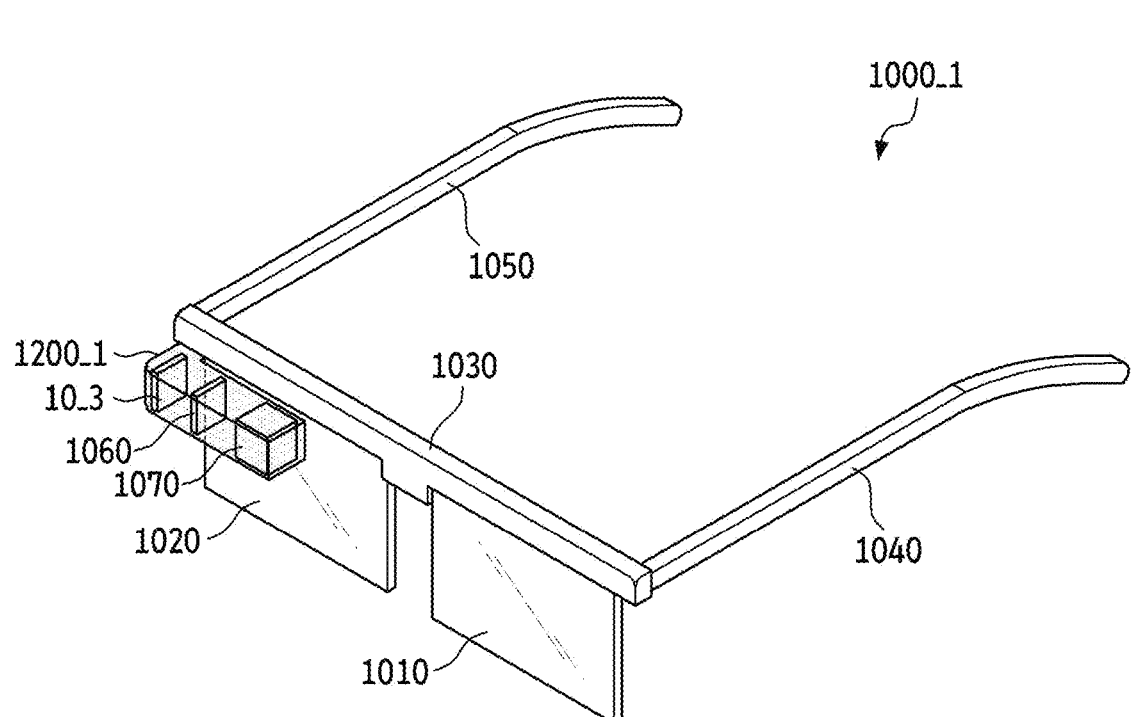
FIG. 10 is a perspective view illustrating a head-mounted display according to one or more embodiments.

The head-mounted band 1300 serves to secure the display device housing 1100 to the user's head such that the first eyepiece 1210 and the second eyepiece 1220 of the housing cover 1200 remain located on the user's left and right eyes, respectively. When the display device housing 1100 is implemented to be lightweight and compact, the head-mounted display 1000 may be provided with, as shown in FIG. 10, an eyeglass frame instead of the head-mounted band 1300.

In addition, the head-mounted display 1000 may further include a battery for supplying power, an external memory slot for accommodating an external memory, and an external connection port and a wireless communication module for receiving an image source. The external connection port may be a universe serial bus (USB) terminal, a display port, or a high-definition multimedia interface (HDMI) terminal, and the wireless communication module may be a 5G communication module, a 4G communication module, a Wi-Fi module, or a Bluetooth module.

FIG. 10 is a perspective view illustrating a head-mounted display according to one or more embodiments.

Referring to FIG. 10, a head-mounted display 1000_1 according to one or more embodiments may be an eye-glasses-type display device in which a display device housing 1200_1 is implemented in a lightweight and compact manner. The head-mounted display 1000_1 according to one or more embodiments may include a display device 10_3, a left eye lens 1010, a right eye lens 1020, a support frame 1030, temples 1040 and 1050, an optical member 1060, an optical path changing member 1070, and the display device housing 1200_1.

The display device housing 1200_1 may include the display device 10_3, the optical member 1060, and the optical path changing member 1070. The image displayed on the display device 10_3 may be magnified by the optical member 1060, and may be provided to the user's right eye through the right eye lens 1020 after the optical path thereof is changed by the optical path changing member 1070. As a result, the user may view an augmented reality image, through the right eye, in which a virtual image displayed on the display device 10_3 and a real image seen through the right eye lens 1020 are combined.

FIG. 10 illustrates that the display device housing 1200_1 is located at the right end of the support frame 1030, but the present specification is not limited thereto. For example, the display device housing 1200_1 may be located at the left end of the support frame 1030, and in this case, the image of the display device 10_3 may be provided to the user's left eye. Alternatively, the display device housing 1200_1 may be located at both the left and right ends of the support frame 1030, and in this case, the user may view the image displayed on the display device 10_3 through both the left and right eyes.

Figure 11:
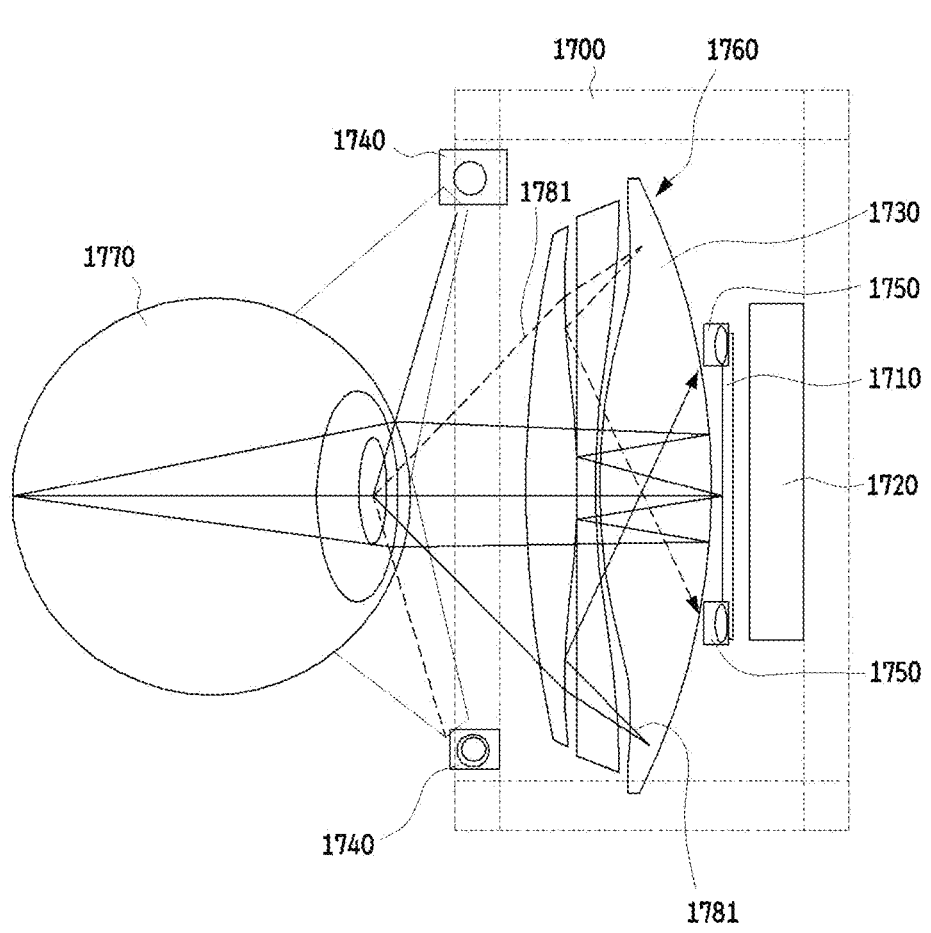
FIG. 11 is a schematic view of a configuration of an electronic device according to one or more embodiments.

FIG. 11 is a schematic view of a configuration of an electronic device according to one or more embodiments. For example, the electronic device shown in FIG. 11 may be an eyeglasses-type mobile electronic device that displays virtual reality or augmented reality. The electronic device shown in FIG. 11 may include the display device 10 described with reference to FIGS. 8 to 10.

According to one or more embodiments, the electronic device that displays virtual reality or augmented reality may be a display device 1700, and may include a display panel 1710, a light-receiving sensor 1750 overlapping the dummy area of the display panel 1710, a circuit substrate 1720 including a driving circuit and a power circuit for driving the display panel 1710, a pancake lens (e.g., a pancake lens unit) 1760 for controlling a path of display light outputted from the display panel 1710, and a light source (e.g., light source module) 1740 for outputting near-infrared light recognized by the light-receiving sensor 1750.

The display panel 1710 may be a display panel described with reference to FIGS. 1 to 7. According to one or more embodiments, the circuit substrate 1720 may include a driving circuit for driving the display panel 1710 and a power circuit, and may be located on the rear surface of the display panel 1710. The circuit substrate 1720 may be a circuit board 300 described with reference to FIG. 1.

According to one or more embodiments, the driving circuit located in the circuit substrate 1720 may be included in the timing controller 400 described with reference to FIG.

28

2. Such driving circuit may control the display panel 1710, the light-receiving sensor 1750, and the light source 1740. For example, the operations of the display panel 1710, the light-receiving sensor 1750, and the light source 1740 described below may be executed by controlling the timing controller 400 (see FIG. 2).

The display panel 1710 may emit display light for displaying augmented reality image (or virtual reality image). For example, the display light emitted from the display panel 1710 is delivered to the pancake lens 1760. A user 1770 may view objects of the augmented reality image (or virtual reality image) by looking at the light guided by the pancake lens 1760.

The display device 1700 detects the eye movement of the user 1770 using near-infrared light, and determines the direction of the user's 1770 gaze. The display device 1700 determines a central vision area corresponding to the gaze of the user 1770, and also determines a peripheral vision area excluding the central vision area. The display device 1700 adjusts the screen displayed by the display panel 1710 based on the tracked eye movement of the user 1770.

The display device 1700 may apply foveated rendering technology that displays high-resolution screen in the central vision area, and that displays low-resolution screen in the peripheral vision area.

The display device 1700 may include the light source 1740 that emits near-infrared light to detect the gaze of the user 1770, that is, eye movement, and also may include a light-receiving sensor 1750 that detects near-infrared light. The display device 1700 emits near-infrared light using the light source 1740. Near infrared light emitted from the light source 1740 is reflected from the eyes of the user 1770, as indicated by an arrow 1781. The near-infrared light reflected from the eyes of the user 1770 is input to the light-receiving sensor 1750 via the pancake lens 1760.

The light-receiving sensor 1750 may track the eyes of the user 1770 by detecting the inputted near-infrared light, and by generating an electrical signal corresponding to the inputted near-infrared light (e.g., reflected light). For example, the light-receiving sensor 1750 may be an optical sensor that recognizes biometric information in an optical manner. The light-receiving sensor 1750 may include a photo diode, but the embodiments are not limited to the form of the light-receiving sensor 1750.

According to one or more embodiments, the near-infrared light for tracking the eye movement of the user 1770 is light with an output wavelength of about 780 nm to about 1400 nm, and the light-receiving sensor 1750 may be a sensor configured to recognize this.

The display device 1700 may convert reflected light detected through the light-receiving sensor 1750 into an electrical signal. The display device 1700 may obtain an eye image of the user 1770 through the converted electrical signal. The display device 1700 may track the gaze movement of the user 1770 using the acquired eye image of the user 1770.

According to one or more embodiments, the light-receiving sensor 1750 may be located on an upper portion of the display panel 1710, and may overlap a dummy area of the display panel 1710. The dummy area of the display panel 1710 is located outside the field of view (FoV) 2001 of the pancake lens 1760. The dummy area where the light-receiving sensor 1750 is located will be described in detail later with reference to FIGS. 12 to 17.

The pancake lens 1760 may be combined with the front surface of the display panel 1710. The display device 1700 may combine a pancake lens 1760 on the display panel 1710 to make images clearer and to increase resolution.

The pancake lens 1760 is an optical device that selectively transmits and reflects light by using a linear polarizing plate, a half mirror, a reflective polarizing plate, or a retardation film to change the direction of light travel. For example, the pancake lens 1760 is a polarization-based optical system that increases the optical path by using the polarization characteristics of light.

According to one or more embodiments, the pancake lens 1760 may include three or more lenses 1730, two Quarter Wave Plates (QWPs), a half mirror, one reflective polarizing plate, and one or more absorbing polarizing plates.

Figure 12:
FIG. 12 is an example of an image which is outputted from a display panel according to one or more embodiments.
Figure 13:
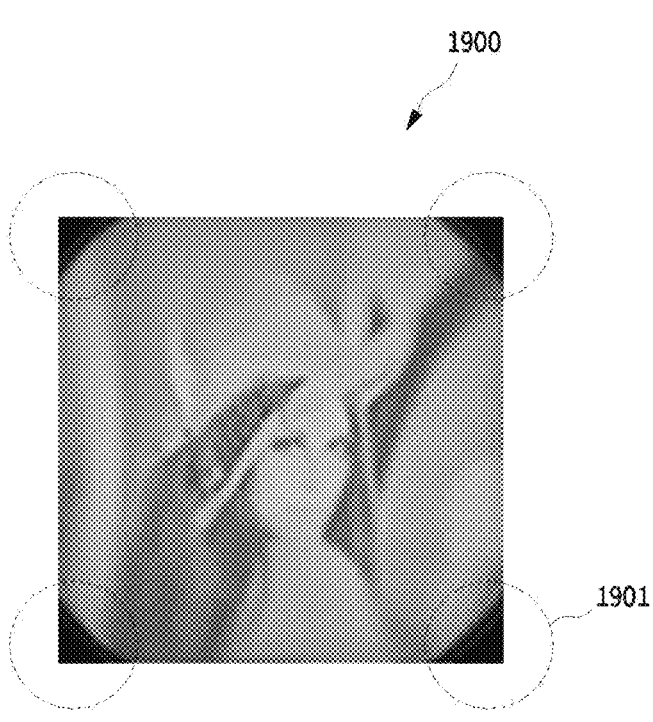
FIG. 13 is a conceptual view illustrating FoV (Field of View) of a pancake lens.

FIG. 12 is an example of an image that is outputted from a display panel according to one or more embodiments. FIG. 13 is a conceptual view illustrating FoV (Field of View) of a pancake lens.

Referring to FIG. 12, the display panel 1710 may emit display light for displaying augmented reality image (or virtual reality image). However, as the display light outputted from the display panel 1710 passes through the pancake lens 1760, a field of view (FoV) is formed as shown in FIG. 13.

Assuming that the display panel 1710 emits display light, such as 1800 in FIG. 12, the user 1770 may only see some of the display light located within a field of view (FoV) 2001 (see FIG. 14) of the pancake lens 1760, such as 1900 in FIG. 13.

A portion of the display panel 1710 corresponding to the outer edge of the field of view (FoV) 2001 of the pancake lens 1760 is a dummy area and a non-visible area in which the light emitted to the user 1770 is not visible to the user 1770 even when the display light is emitted. For example, the non-visible area may be located at each corner of the display panel 1710, as shown at 1901 in FIG. 13, and the display light emitted from the non-visible area of the display panel 1710 may not be viewed by the user.

FIGS. 14 to 17 are layout diagrams of a light-receiving sensor and a display panel according to one or more embodiments.

Referring to FIGS. 14 to 17, the display device 1700 displays the light-receiving sensor 1750 to overlap the non-visible area (e.g., dummy area) 1901 (see FIG. 13) of the display panel 1710 corresponding to the outer edge of the field of view (FoV) 2001 of the pancake lens 1760.

The display panel 1710 may be divided into a visible area 2011 corresponding to the inside of the field of view (FoV) 2001 of the pancake lens 1760, and a non-visible area 2012 corresponding to the outside of the field of view (FoV) 2001 of the pancake lens 1760. The field of view (FoV) 2001 of the pancake lens 1760 has a circular shape when viewed on a plane. Accordingly, the boundary of the visible area 2011 of the display panel 1710 may have a circular shape.

The non-visible area 2012 of the display panel 1710 may be an area that is not visible to the user 1770 even when the display light is emitted, located outside the visible area 2011 of circular shape, and may be defined as a dummy area. The non-visible area 2012 of the display panel 1710 (e.g., the dummy area) may include four corner areas of the display panel 1710. For example, the non-visible area 2012 of the display panel 1710 may include a first corner area, a second corner area, a third corner area, and a fourth corner area.

According to one or more embodiments, the light-receiving sensor 1750 may overlap at least one of the first corner area, the second corner area, the third corner area, and the fourth corner area. As the light-receiving sensor 1750 is located at the outer edge of the field of view (FoV) 2001 of the pancake lens 1760, no interference is caused due to the display light emitted from the display panel 1710. In addition, as the position of the light-receiving sensor 1750 is optimized, the weight and volume of the display device 1700 may be reduced.

Figure 14:
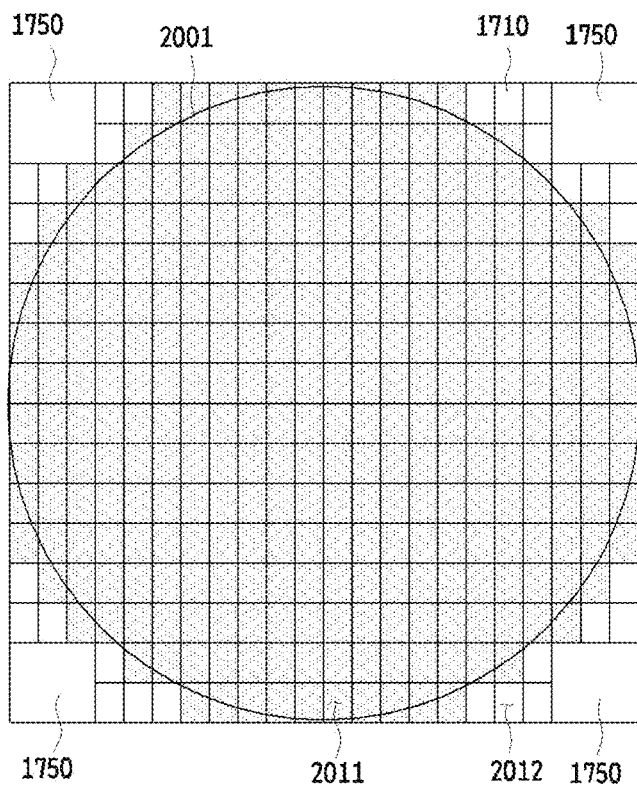
FIGS. 14 to 17 are layout diagrams of a light-receiving sensor and a display panel according to one or more embodiments.

According to one or more embodiments, the light-receiving sensor 1750 may be located in each of the four corner areas of the display panel 1710 as illustrated in FIG. 14. The light-receiving sensor 1750 overlaps each of the first corner area, the second corner area, the third corner areas, and the fourth corner area of the display panel 1710. The display device 1700 may include four light-receiving sensors 1750, and the four light-receiving sensors 1750 may be located on top of the first corner area, the second corner area, the third corner areas, and the fourth corner area, respectively.

Figure 15:
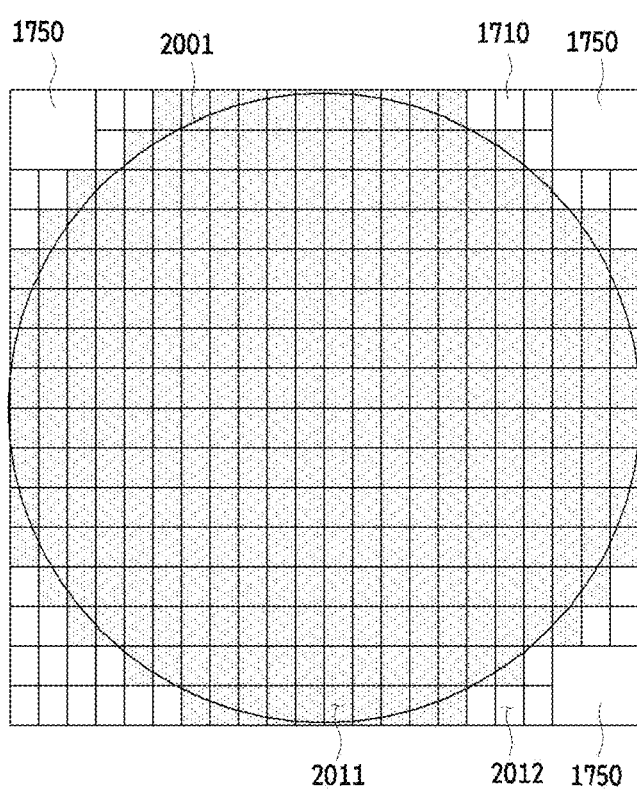

According to one or more embodiments, the light-receiving sensor 1750 may include three light-receiving sensors 1750 as illustrated in FIG. 15, and the three light-receiving sensors 1750 may overlap three areas selected among the first corner area, the second corner area, the third corner areas, and the fourth corner area.

Figure 16:
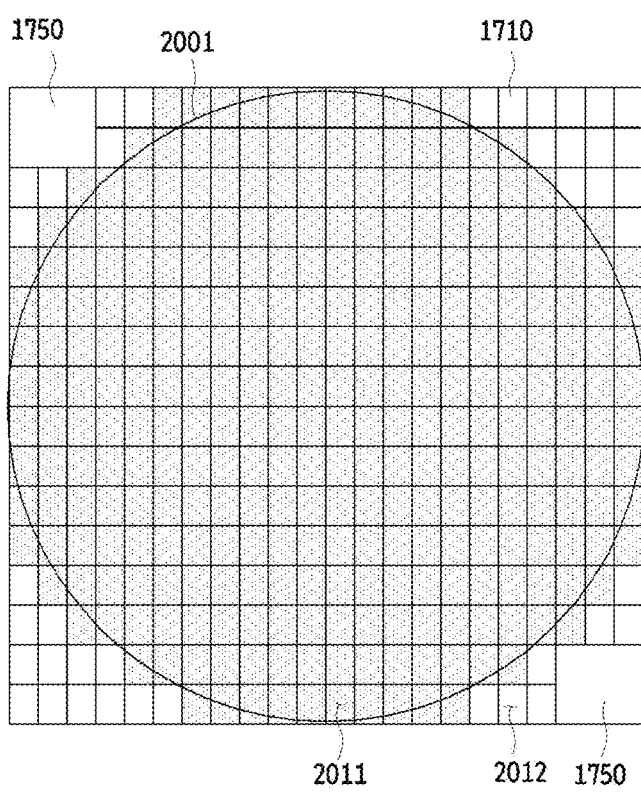

According to one or more embodiments, the light-receiving sensor 1750 may include two light-receiving sensors 1750 as illustrated in FIG. 16, and the two light-receiving sensors 1750 may overlap two areas selected among the first corner area, the second corner area, the third corner areas, and the fourth corner area.

Figure 17:
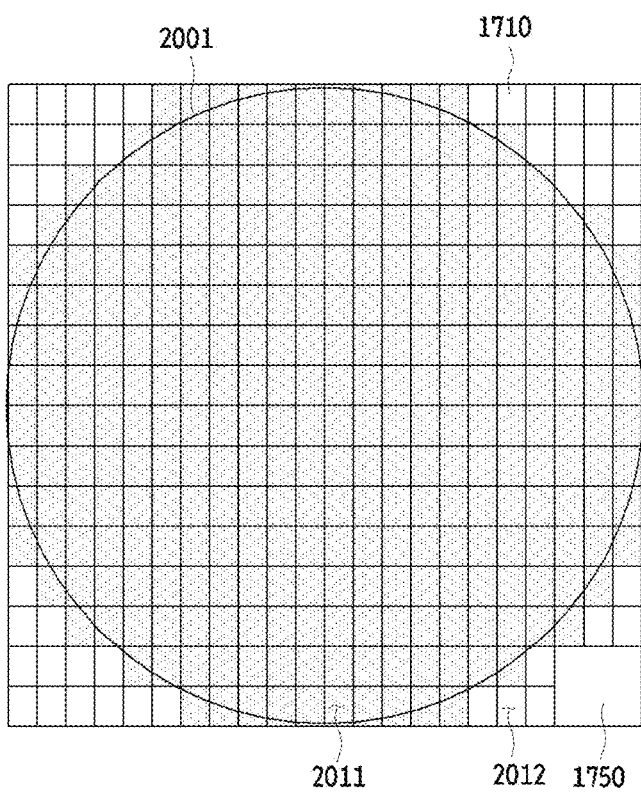

According to one or more embodiments, the light-receiving sensor 1750 may include one light-receiving sensor 1750 as illustrated in FIG. 17, and the one light-receiving sensor 1750 may overlap one area selected among the first corner area, the second corner area, the third corner areas, and the fourth corner area.

Figure 18:
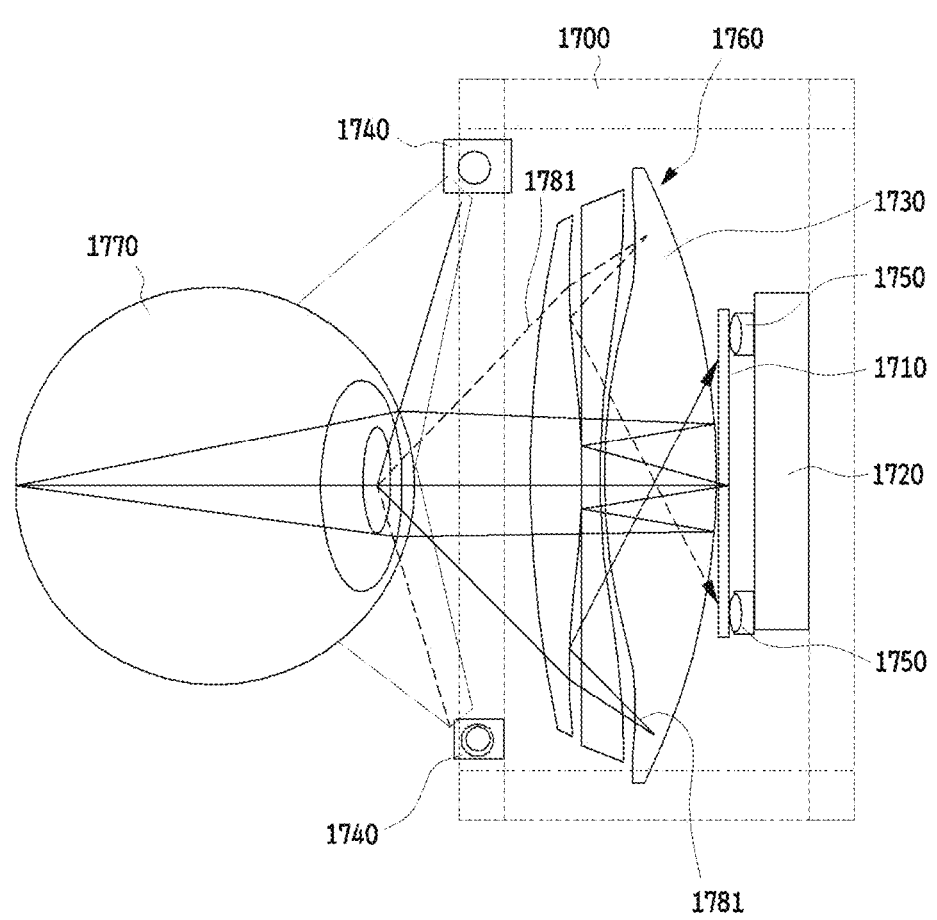
FIG. 18 is a schematic view of a configuration of an electronic device according to one or more other embodiments.

FIG. 18 is a schematic view of a configuration of an electronic device according to one or more other embodiments.

The one or more embodiments corresponding to FIG. 18 differs from the one or more embodiments corresponding to FIG. 11 in that the light-receiving sensor 1750 is located on the rear surface of the display panel 1710.

Referring to FIG. 18, in the display device 1700, the light-receiving sensor 1750 overlaps the dummy area of the display panel 1710 corresponding to the outer edge of the field of view (FoV) 2001 of the pancake lens 1760, and the light-receiving sensor 1750 is located on the rear surface of the display panel 1710. For example, the light-receiving sensor 1750 is located between the display panel 1710 and the circuit substrate 1720.

According to one or more embodiments, as the light-receiving sensor 1750 is located on the rear surface of the display panel 1710, the light-receiving sensor 1750 detects near-infrared light passing through the display panel 1710. To this end, the non-visible area 2012 of the display panel 1710 overlapping with the light-receiving sensor 1750 (e.g., the dummy area, such as the first corner area, the second corner area, the third corner area, and/or the fourth corner area) may be designed as an area that can transmit light.

According to one or more embodiments, each of the first corner area, the second corner area, the third corner area, and the fourth corner area, which is the non-visible area 2012 of the display panel 1710, includes a transparent area where a light-emitting element LE (see FIG. 3) is not located. For example, each of the first corner area, the second corner area, the third corner area, and the fourth corner area, which is the non-visible area 2012, may omit the conductive layers ML1 to ML8 (see FIG. 7) of transparent material and a display element layer EML (see FIG. 7). For example, transmittance of each of the first corner area, the second corner area, the third corner area, and the fourth corner area, which is the non-visible area 2012, may be a transmittance (e.g., predetermined transmittance), for example, a transmittance of approximately 80% or more, but the present disclosure is not limited thereto.

It should be understood, however, that the aspects and features of embodiments of the present disclosure are not restricted to the one set forth herein. The above and other aspects of the present disclosure will become more apparent to one of ordinary skill in the art to which the present disclosure pertains by referencing the claims, with equivalents thereof to be included therein.

What is claimed is:

1. A display device comprising:
a frame;
a display panel supported by the frame;
a pancake lens for controlling a path of a display light outputted from the display panel;
a light-receiving sensor at corners of the display panel and overlapping a dummy area of the display panel spaced apart from the frame, the dummy area being at an outer edge of a field of view of the pancake lens;
a circuit substrate comprising a driving circuit for driving the display panel and a power circuit; and
a light source configured to output near-infrared light to be recognized by the light-receiving sensor.

2. The display device of claim 1, wherein the display panel comprises a first corner area, a second corner area, a third corner area, and fourth corner area positioned on the outer edge of the field of view of the pancake lens, and
wherein the light-receiving sensor overlaps the first corner area, the second corner area, the third corner area, and the fourth corner area.

3. The display device of claim 2, wherein the light-receiving sensor is at a top of the first corner area, the second corner area, the third corner area, and the fourth corner area.

4. The display device of claim 3, wherein the light-receiving sensor is between the display panel and the pancake lens.

5. The display device of claim 2, wherein the light-receiving sensor is at a bottom of the first corner area, the second corner area, the third corner area, and the fourth corner area, and
wherein the first corner area, the second corner area, the third corner area, and the fourth corner area comprise a transparent area in which no light-emitting element is located.

6. The display device of claim 5, wherein the light-receiving sensor is between the display panel and the circuit substrate.

7. The display device of claim 6, wherein the light-receiving sensor is configured to detect the near-infrared light.

8. The display device of claim 1, wherein the display panel comprises a silicon substrate, and a light-emitting element on the silicon substrate.

9. The display device of claim 1, wherein the circuit substrate comprises a control circuit configured to track eye movement of a user by using the light-receiving sensor, and configured to control a screen of the display panel based on the eye movement.

10. The display device of claim 9, wherein the circuit substrate is of a timing controller.

11. A eyeglasses-type mobile electronic device for displaying virtual reality or augmented reality, and comprising:
a frame;
a display panel supported by the frame;
a pancake lens for controlling a path of a display light outputted from the display panel;
a light-receiving sensor at corners of the display panel and overlapping a dummy area of the display panel spaced apart from the frame, the dummy area being on an outer edge of a field of view of the pancake lens;
a circuit substrate comprising a driving circuit for driving the display panel and a power circuit; and
a light source configured to output near-infrared light recognized by the light-receiving sensor.

12. The eyeglasses-type mobile electronic device of claim 11, wherein the display panel comprises a first corner area, a second corner area, a third corner area, and fourth corner area at the outer edge of the field of view of the pancake lens, and
wherein the light-receiving sensor overlaps the first corner area, the second corner area, the third corner area, and the fourth corner area.

13. The eyeglasses-type mobile electronic device of claim 12, wherein the light-receiving sensor is at a top of the first corner area, the second corner area, the third corner area, and the fourth corner area.

14. The eyeglasses-type mobile electronic device of claim 13, wherein the light-receiving sensor is between the display panel and the pancake lens.

15. The eyeglasses-type mobile electronic device of claim 12, wherein the light-receiving sensor is at a bottom of the first corner area, the second corner area, the third corner area, and the fourth corner area, and
wherein the first corner area, the second corner area, the third corner area, and the fourth corner area comprise a transparent area in which no light-emitting element is located.

16. The eyeglasses-type mobile electronic device of claim 15, wherein the light-receiving sensor is between the display panel and the circuit substrate.

17. The eyeglasses-type mobile electronic device of claim 16, wherein the light-receiving sensor is configured to detect the near-infrared light.

18. The eyeglasses-type mobile electronic device of claim 11, wherein the display panel comprises a silicon substrate, and a light-emitting element on the silicon substrate.

19. The eyeglasses-type mobile electronic device of claim 11, wherein the circuit substrate comprises a control circuit configured to track eye movement of a user by using the light-receiving sensor, and configured to control a screen of the display panel based on the eye movement.

20. The eyeglasses-type mobile electronic device of claim 19, wherein the control circuit is of a timing controller.

* * * * *